(12) United States Patent
Aninye et al.

(10) Patent No.: US 9,373,241 B2
(45) Date of Patent: *Jun. 21, 2016

(54) SYSTEM AND METHOD FOR MONITORING A WIRELESS TRACKING DEVICE

(71) Applicant: Omnilink Systems, Inc., Alpharetta, GA (US)

(72) Inventors: Steve Aninye, Alpharetta, GA (US); Yoganand Rajala, Alpharetta, GA (US)

(73) Assignee: OmniLink Systems, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,941

(22) Filed: Jul. 9, 2013

(65) Prior Publication Data

US 2013/0293378 A1    Nov. 7, 2013

Related U.S. Application Data

(60) Division of application No. 11/935,858, filed on Nov. 6, 2007, now Pat. No. 8,547,222, which is a continuation of application No. PCT/US2006/017678, filed on May 8, 2006, and a continuation of application No. PCT/US2006/012754, filed on Apr. 6, 2006.

(60) Provisional application No. 60/678,823, filed on May 6, 2005.

(51) Int. Cl.
*G08B 1/08* (2006.01)
*G08B 21/18* (2006.01)
(Continued)

(52) U.S. Cl.
CPC ............ *G08B 21/18* (2013.01); *G07C 9/00111* (2013.01); *G08B 21/0211* (2013.01);
(Continued)

(58) Field of Classification Search
CPC .................................................. G08B 21/18
USPC ............................ 340/936, 905, 539.13, 441
See application file for complete search history.

(56) References Cited

U.S. PATENT DOCUMENTS 4,359,733 A   11/1982   O'Neill
4,673,936 A    6/1987   Kotoh
(Continued)

FOREIGN PATENT DOCUMENTS

EP    0745867    12/1996
EP    1363258    11/2003
(Continued)

OTHER PUBLICATIONS

Search Report issued in PCT/US2006/017541 on Jul. 31, 2007.
(Continued)

*Primary Examiner* — Brent Swarthout
(74) *Attorney, Agent, or Firm* — King & Spalding

(57) ABSTRACT

Monitoring systems and methods may monitor locations and/or speeds of a wireless tracking device. An administrative hub comprising a location database including speed limit data for at least selected road segments may be configured to monitor locations of the wireless tracking device based on data reported by the wireless tracking device. The administrative hub may also be configured to compare a speed of the wireless tracking device based on the data reported by the wireless tracking device to the speed limit data for a road segment associated with the location of the wireless tracking device.

18 Claims, 26 Drawing Sheets

(51) Int. Cl.
  *G07C 9/00* (2006.01)
  *G08B 21/02* (2006.01)
  *G08B 21/04* (2006.01)
  *G08B 21/22* (2006.01)
  *G08B 25/00* (2006.01)
  *H04W 4/02* (2009.01)
  *H04W 4/18* (2009.01)
  *H04W 4/20* (2009.01)
  *H04L 29/08* (2006.01)

(52) U.S. Cl.
  CPC ........ *G08B21/0261* (2013.01); *G08B 21/0269* (2013.01); *G08B 21/0272* (2013.01); *G08B 21/0286* (2013.01); *G08B 21/0288* (2013.01); *G08B 21/0423* (2013.01); *G08B 21/0492* (2013.01); *G08B 21/22* (2013.01); *G08B 25/006* (2013.01); *G08B 25/008* (2013.01); *H04L 67/18* (2013.01); *H04W 4/02* (2013.01); *H04W 4/18* (2013.01); *H04W 4/20* (2013.01)

(56) References Cited

U.S. PATENT DOCUMENTS

| | | |
|---|---|---|
| 4,736,196 A | 4/1988 | McMahon |
| 4,747,120 A | 5/1988 | Foley |
| 4,750,197 A | 6/1988 | Denekamp et al. |
| 4,777,477 A | 10/1988 | Watson |
| 4,812,823 A | 3/1989 | Dickerson |
| 4,885,571 A | 12/1989 | Pauley |
| 4,918,425 A | 4/1990 | Greenberg et al. |
| 4,918,432 A | 4/1990 | Pauley et al. |
| 4,952,928 A | 8/1990 | Carroll |
| 4,999,613 A | 3/1991 | Williamson |
| 5,043,736 A | 8/1991 | Darnell |
| 5,182,543 A | 1/1993 | Siegel |
| 5,204,670 A | 4/1993 | Stinton |
| 5,223,844 A | 6/1993 | Mansell |
| 5,298,884 A | 3/1994 | Gilmore |
| 5,365,516 A | 11/1994 | Jandrell |
| 5,461,365 A | 10/1995 | Schlager et al. |
| 5,461,390 A | 10/1995 | Hoshen |
| 5,468,110 A | 11/1995 | McDonald et al. |
| 5,471,197 A | 11/1995 | McCurdy et al. |
| 5,493,694 A | 2/1996 | Vlcek |
| 5,497,148 A | 3/1996 | Oliva |
| 5,497,149 A | 3/1996 | Fast |
| 5,504,474 A | 4/1996 | Libman |
| 5,518,402 A | 5/1996 | Tommarello |
| 5,523,740 A | 6/1996 | Burgmann |
| 5,537,102 A | 7/1996 | Pinnow |
| 5,552,772 A | 9/1996 | Janky et al. |
| 5,559,520 A | 9/1996 | Barzegar |
| 5,568,119 A | 10/1996 | Schipper et al. |
| 5,593,267 A | 1/1997 | McDonald et al. |
| 5,594,425 A | 1/1997 | Ladner |
| 5,623,390 A | 4/1997 | Noda et al. |
| 5,627,520 A | 5/1997 | Grubbs |
| 5,646,632 A | 7/1997 | Khan |
| 5,650,766 A | 7/1997 | Burgmann |
| 5,650,770 A | 7/1997 | Schlager et al. |
| 5,652,570 A | 7/1997 | Lepkofkor |
| 5,712,619 A | 1/1998 | Simkin |
| 5,714,931 A | 2/1998 | Petite et al. |
| 5,731,757 A | 3/1998 | Layson |
| 5,742,233 A | 4/1998 | Hoffman et al. |
| 5,742,509 A | 4/1998 | Goldberg et al. |
| 5,748,148 A | 5/1998 | Heiser |
| 5,752,976 A | 5/1998 | Duffin |
| 5,825,283 A | 10/1998 | Camhi |
| 5,828,987 A | 10/1998 | Tano et al. |
| 5,835,377 A | 11/1998 | Bush |
| 5,835,907 A | 11/1998 | Newman |
| 5,838,237 A | 11/1998 | Revell et al. |
| 5,852,401 A | 12/1998 | Kita |
| 5,857,433 A | 1/1999 | Files |
| 5,867,103 A | 2/1999 | Taylor |
| 5,870,029 A | 2/1999 | Otto et al. |
| 5,890,061 A | 3/1999 | Timm |
| 5,892,454 A | 4/1999 | Schipper et al. |
| D410,206 S | 5/1999 | Slater |
| 5,905,461 A | 5/1999 | Neher |
| 5,940,004 A | 8/1999 | Fulton |
| 5,948,038 A | 9/1999 | Daley et al. |
| 5,952,941 A * | 9/1999 | Mardirossian ................ 340/936 |
| 5,959,533 A | 9/1999 | Layson, Jr. |
| 5,982,281 A | 11/1999 | Layson, Jr. |
| 5,990,793 A | 11/1999 | Bieback |
| 6,011,510 A | 1/2000 | Yee |
| 6,014,080 A | 1/2000 | Layson, Jr. |
| 6,024,928 A | 2/2000 | Foster |
| 6,054,928 A | 4/2000 | Lemelson et al. |
| D424,463 S | 5/2000 | Babers, Jr. |
| 6,072,396 A | 6/2000 | Gaukel |
| 6,084,517 A | 7/2000 | Rabanne |
| 6,084,547 A | 7/2000 | Sanderford |
| 6,100,806 A | 8/2000 | Gaukel |
| 6,104,295 A | 8/2000 | Tenarvitz et al. |
| 6,131,067 A | 10/2000 | Gired et al. |
| 6,150,921 A | 11/2000 | Werb |
| 6,160,481 A | 12/2000 | Taylor, Jr. |
| 6,181,253 B1 | 1/2001 | Eschenbach et al. |
| 6,198,431 B1 | 3/2001 | Gibson |
| D440,170 S | 4/2001 | Conerly |
| 6,218,945 B1 | 4/2001 | Taylor, Jr. |
| 6,232,880 B1 | 5/2001 | Anderson et al. |
| 6,232,916 B1 | 5/2001 | Grillo |
| 6,239,700 B1 | 5/2001 | Hoffman et al. |
| 6,240,773 B1 * | 6/2001 | Rita et al. ................ 73/114.01 |
| 6,278,370 B1 | 8/2001 | Underwood |
| 6,334,086 B1 * | 12/2001 | Park et al. ................ 701/117 |
| 6,344,794 B1 | 2/2002 | Ulrich et al. |
| 6,353,406 B1 | 3/2002 | Lanzl |
| 6,356,841 B1 | 3/2002 | Hamrick et al. |
| 6,392,565 B1 | 5/2002 | Brown |
| 6,405,213 B1 | 6/2002 | Layson, Jr. |
| 6,430,813 B2 | 8/2002 | Muraguchi et al. |
| 6,431,455 B1 | 8/2002 | Ponert |
| 6,438,380 B1 | 8/2002 | Bi |
| 6,483,427 B1 | 11/2002 | Werb |
| 6,486,801 B1 | 11/2002 | Jones |
| 6,512,456 B1 | 1/2003 | Taylor, Jr. |
| 6,581,546 B1 | 6/2003 | Dalland |
| 6,606,556 B2 | 8/2003 | Curatolo et al. |
| 6,624,750 B1 | 9/2003 | Marman et al. |
| 6,639,516 B1 | 10/2003 | Copley |
| 6,646,617 B1 | 11/2003 | Gaukel |
| 6,674,368 B2 | 1/2004 | Hawkins |
| 6,703,936 B2 | 3/2004 | Hill et al. |
| 6,711,500 B2 | 3/2004 | Chen |
| 6,747,555 B2 | 6/2004 | Fellenstein et al. |
| 6,774,797 B2 | 8/2004 | Freathy et al. |
| 6,774,799 B2 | 8/2004 | Defant |
| 6,801,853 B2 | 10/2004 | Workman |
| 6,812,824 B1 | 11/2004 | Goldinger |
| 6,838,998 B1 | 1/2005 | Brown |
| 6,840,904 B2 | 1/2005 | Goldberg |
| 6,862,454 B1 | 3/2005 | Kanevsky |
| 6,914,541 B1 * | 7/2005 | Zierden ................ 340/937 |
| RE38,838 E | 10/2005 | Taylor |
| 6,961,592 B2 | 11/2005 | O'Connor |
| 6,972,684 B2 | 12/2005 | Copley |
| 6,975,222 B2 | 12/2005 | Krishan |
| 6,975,234 B2 | 12/2005 | Boccacci |
| 6,992,582 B2 | 1/2006 | Hill |
| 7,015,817 B2 | 3/2006 | Copley |
| 7,034,678 B2 | 4/2006 | Burkley et al. |
| 7,034,695 B2 | 4/2006 | Troxler |
| D520,393 S | 5/2006 | Darby |
| 7,038,590 B2 | 5/2006 | Hoffman et al. |
| 7,064,670 B2 | 6/2006 | Galperin |
| 7,079,034 B2 | 7/2006 | Stilp |
| 7,098,795 B2 | 8/2006 | Adamczyk et al. |
| 7,119,695 B2 | 10/2006 | Defant |

(56) References Cited

U.S. PATENT DOCUMENTS

| | | | |
|---|---|---|---|
| 7,123,141 | B2 | 10/2006 | Contestabile |
| D534,822 | S | 1/2007 | Wadda |
| D535,205 | S | 1/2007 | Frederick et al. |
| 7,209,757 | B2 | 4/2007 | Naghian et al. |
| 7,283,044 | B2 | 10/2007 | Bandy |
| 7,289,786 | B2 | 10/2007 | Krasner |
| RE39,909 | E | 11/2007 | Taylor, Jr. |
| 7,299,987 | B2 | 11/2007 | Yoo et al. |
| 7,382,268 | B2 | 6/2008 | Hartman |
| 7,492,254 | B2 | 2/2009 | Bandy et al. |
| 7,518,514 | B2 | 4/2009 | Bauchot et al. |
| 7,598,855 | B2 | 10/2009 | Scalisi et al. |
| 7,619,533 | B2 | 11/2009 | Crucilla |
| 7,728,724 | B1 | 6/2010 | Scalisi et al. |
| 7,848,761 | B2 | 12/2010 | Caspi |
| 7,877,104 | B2 | 1/2011 | Turetzky |
| 7,884,712 | B2 | 2/2011 | Nierenberg |
| 8,130,697 | B1* | 3/2012 | Fan et al. ............ 370/328 |
| 8,547,222 | B2* | 10/2013 | Aninye et al. ......... 340/539.13 |
| 2001/0048364 | A1 | 12/2001 | Kalthoff et al. |
| 2002/0022920 | A1* | 2/2002 | Straub ........... B60K 31/0058 701/93 |
| 2002/0126023 | A1* | 9/2002 | Awada ............ 340/905 |
| 2003/0030561 | A1 | 2/2003 | Yafuso |
| 2003/0034894 | A1 | 2/2003 | Montagnino |
| 2003/0112141 | A1 | 6/2003 | Arunkumar |
| 2003/0210142 | A1 | 11/2003 | Freathy et al. |
| 2003/0227382 | A1 | 12/2003 | Breed |
| 2004/0257245 | A1* | 12/2004 | Jo .................. 340/936 |
| 2005/0264404 | A1* | 12/2005 | Franczyk et al. ........ 340/441 |
| 2006/0109110 | A1 | 5/2006 | Hill |
| 2006/0266917 | A1 | 11/2006 | Baldis et al. |
| 2007/0129012 | A1 | 6/2007 | Snow |
| 2007/0185728 | A1 | 8/2007 | Schwarz |
| 2007/0276270 | A1 | 11/2007 | Tran |
| 2008/0001764 | A1 | 1/2008 | Douglas et al. |
| 2008/0055109 | A1 | 3/2008 | Freathy |
| 2008/0108370 | A1 | 5/2008 | Aninye |
| 2008/0278327 | A1 | 11/2008 | Nierenberg |
| 2009/0021398 | A1 | 1/2009 | Thompson |
| 2009/0251313 | A1 | 10/2009 | Perkins |
| 2011/0128148 | A1 | 6/2011 | Nierenberg |

FOREIGN PATENT DOCUMENTS

| | | |
|---|---|---|
| EP | 1612755 | 7/2006 |
| GB | 2279170 | 12/1994 |
| GB | 2383666 | 7/2003 |
| GB | 2416094 | 1/2006 |
| WO | WO 88/09541 | 12/1988 |

OTHER PUBLICATIONS

International Preliminary Report of Patentability issued in PCT/US06/017541.
Search Report issued in PCT/US2006/017678 on Sep. 8, 2006.
International Preliminary Report of Patentability issued in PCT/US06/017678.
Murphy, John. "Advanced Electronic Monitoring for Tracking Persons on Probation or Parole," Feb. 29, 1996, pp. 1-34 and Appendix A.
Hoshen, Joseph. "Keeping Tabs on Criminals," IEEE Spectrum, Feb. 1995, pp. 26-31.
Whitfield, Dick. "Tackling the Tag," Chapter 9, 1997, pp. 109-119.
Pro Tech Monitoring, Inc., SMART Systems Briefing, circa 1995-1996.
EBSCO Host, "'Spy' In the Sky," Onternational Construction, 00206415, Aug. 1997, vol. 36, Issue 8.
Gable, Ralph. "Application of Personal Telemonitoring to Current Problems in Corrections," Journal of Criminal Justice, vol. 14, pp. 167-176 (1986).
Holland, James. Political Implications of Applying Behavioral Pschology, Mexico City, 1972.
Mainprize, Steve. "Elective Affinities in the Engineering of Social Control: The Evolution of Electronic Monitoring," ISSN: 1198 3655, Electronic Journal of Sociology (1996).
Le Marshall, Chris. "Single Geostatic Orbital Satellite in Tracking Ground-Based Mobile Radio Transmitter," National Air Intelligence Center, Oct. 11, 1995.
Montes, Marisela. "Technological Advances in Parole Supervision," Corrections Today, vol. 58, Issue 4, Jul. 1996.
Nieto, Marcus. "Community Correction Punishments: An Alternative to Incarceration for Nonviolent Offenders," May 1996.
Schwitzgebel, Robert. "Psychotechnology Electronic Control of Mind and Behavior," Chapter 4, New York, 1973.
Reexamination Control No. 90/010,372 filed Dec. 26, 2008.
Wade, Andy. Book Review: *Tracking the Tag: The Electronic Monitoring of Offenders*, by Dick Whitfield, Probation Journal; 1997; 44; 234.
Harris County Invitation to Bid, Lease of Electronic Monitoring Equipment for the Harris County Community Supervision and Correction Department, circa 1994.
Electronic Monitoring: A listing of materials available at the Justice Institute Library, Oct. 6, 2006.
File history of U.S. Pat. No. 6,100,806.
"Current Electronic Monitoring Market Place", circa 1995-1996.
Extended European Search Report issued in EP Appl 06759293.1 on Oct. 23, 2009.
Extended European Search Report issued in EP Appl 06740595.1 on Oct. 5, 2009.
European Search Report issued in EP Appl 10150064.3 on Mar. 12, 2010.
English Abstract of DE 19832671 published Jan. 27, 2000.
File History of U.S. Appl. No. 12/112,695.
File History of U.S. Appl. No. 12/350,678.
File History of U.S. Appl. No. 10/591,830.
File History of U.S. Appl. No. 11/935,833 (now U.S. Pat. No. 7,518,500).
File History of U.S. Appl. No. 11/935,858.
File History of U.S. Appl. No. 29/279,448.
File History of U.S. Appl. No. 12/639,524.
Notice of Allowance issued in EP Appl 06759293.1 on Dec. 7, 2010.
International Search Report and Written Opinion issued in PCT/US2011/023144 mailed Oct. 12, 2011.
http://www.indiamart.com/focuztechnologyenabledservices/remote-monitoring-system.html electronically captured on Feb. 22, 2012.
http://www.traccia.in/traccia/FleetManagement.aspx on Feb. 12, 2010 electronically captured using the Internet Archive Wayback Machine.
http://www.lockwoodtechnology.com/index/case-studies?id=6 on Oct. 31, 2012 electronically captured using the Internet Archive Wayback Machine.
File History of U.S. Appl. No. 13/750,205.
Office Action issued in Canadian Application No. 2,607,236 dated Feb. 25, 2013.
U.S. Appl. No. 90/010,372, filed Dec. 26, 2008, Taylor.

\* cited by examiner

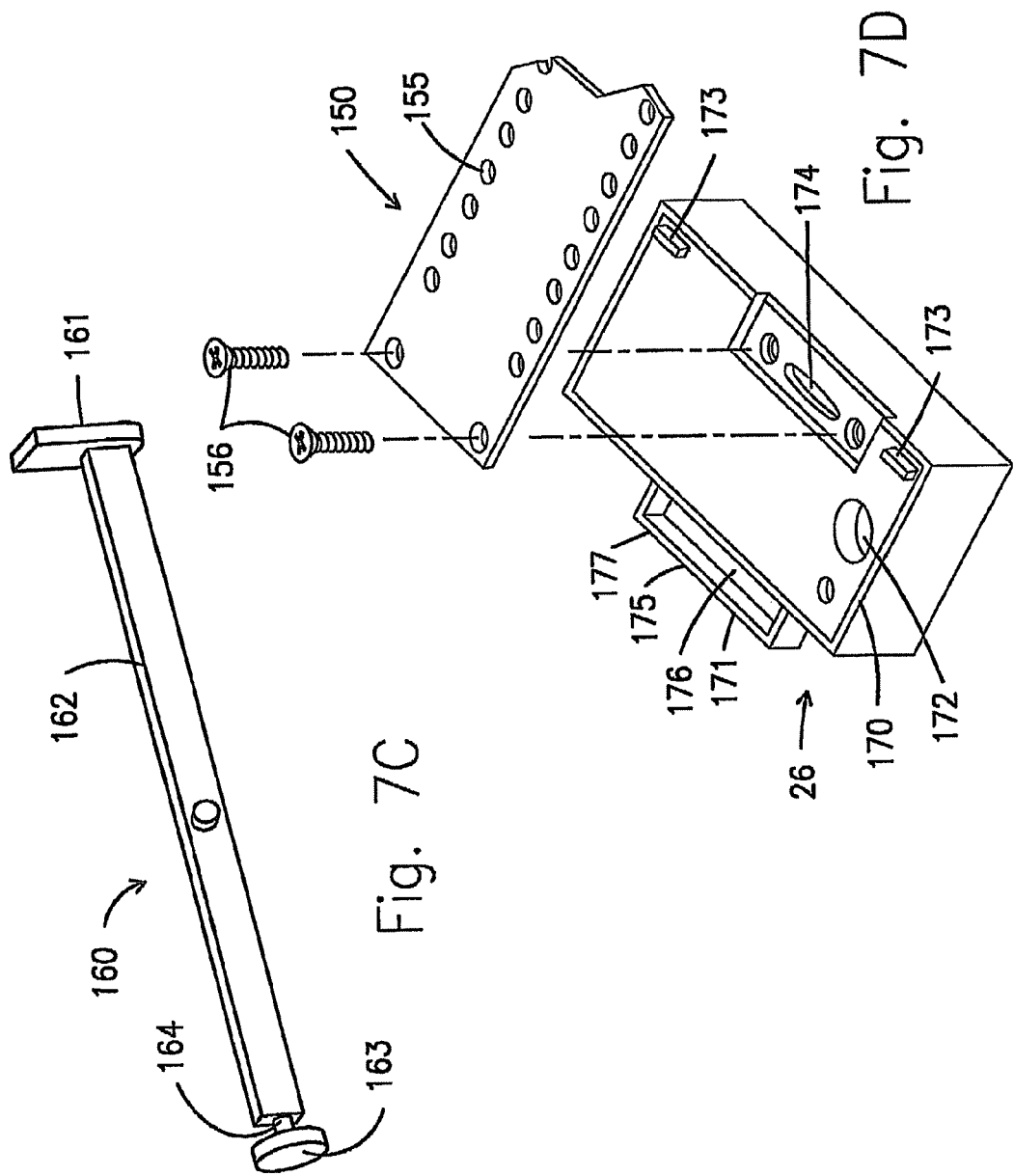

Map Text – Rout History Info of Aninye, Steve (Driver)

Export — 317

| No | Time | | Street Address | City |
|---|---|---|---|---|
| 1 | 3/10/2005 | 11:50:26 AM | 1299 ST RT 140 | ROSWELL – 30076 |
| 2 | 3/10/2005 | 11:51:45 AM | MARKET BLVD. | ROSWELL – 30076 |
| 3 | 3/10/2005 | 11:53:02 AM | 1618 HOLCOMB BRIDGE RD | ROSWELL – 30076 |
| 4 | 3/10/2005 | 11:55:30 AM | 2275 HWY 140 | ROSWELL – 30022 |
| 5 | 3/10/2005 | 11:57:37 AM | 2924 HWY 140 | ROSWELL – 30022 |
| 6 | 3/10/2005 | 11:50:26 AM | 3070 HWY 140 | ROSWELL – 30022 |
| 7 | 3/10/2005 | 12:36:32 PM | 8668 NESBIT FERRY RD | ROSWELL – 30022 |
| 8 | 3/10/2005 | 2:47:36 PM | 9252 NESBIT FERRY RD | ROSWELL – 30022 |
| 9 | 3/10/2005 | 2:49:13 PM | 8965 NESBIT FERRY RD | ROSWELL – 30022 |
| 10 | 3/10/2005 | 2:52:02 PM | 120 RIVERSONS DR | ROSWELL – 30076 |
| 11 | 3/10/2005 | 2:53:15 PM | 2327 HWY 140 | ROSWELL – 30076 |
| 12 | 3/10/2005 | 2:55:21 PM | 1772 ST RT 14 | ROSWELL – 30076 |
| 13 | 3/10/2005 | 2:57:33 PM | 1422 HWY 140 | ROSWELL – 30076 |
| 14 | 3/10/2005 | 2:58:50 PM | HWY 400 | ROSWELL – 30076 |
| 15 | 3/10/2005 | 3:01:15 PM | HWY 400 | ALPHARETTA – 30022 |
| 16 | 3/10/2005 | 3:03:54 PM | HWY 400 | ALPHARETTA – 30022 |
| 17 | 3/10/2005 | 3:05:10 PM | HWY 400 | ALPHARETTA – 30005 |
| 18 | 3/10/2005 | 3:07:44 PM | HWY 400 | ALPHARETTA – 30005 |

Fig. 9B

SYSTEM AND METHOD FOR MONITORING A WIRELESS TRACKING DEVICE

Priority

This application is a Divisional of U.S. patent application Ser. No. 11/935,858, filed Nov. 6, 2007 now U.S. Pat. No. 8,547,222, which is a Continuation of International Application No. PCT/U.S. 2006/017678 filed on May 8, 2006, which in turn is based U.S. provisional Patent Application No. 60/678,823, filed on May 6, 2005. The present application also claims priority to the Apr. 6, 2006 filing date of PCT/U.S. 2006/012754. All of these applications are incorporated herein by reference in their entirety.

FIELD OF THE INVENTION

The system and method of the present invention is utilized in determining the position of an individual using GPS signals and cell phone location technologies for both real time and later comparison with parameters and providing bidirectional communication capability with the tracking device associated with the individual, and providing a response network to address critical alarm conditions.

BACKGROUND OF THE INVENTION

Many devices and systems are known to monitor the position and movements of individuals. Employers use devices to monitor employees against diversion from work-related locations, and such devices may be installed in work vehicles, attached to accessories such as computers, or comprise other GPS enabled devices. In addition, in the case of house arrest, the offender must often carry a body-worn device to permit position monitoring. The monitoring of individuals may take either active or passive forms. An active system will compare its location with ongoing restrictions to detect violations. Such a violation may occur by either coming into broadcast range of a prohibited zone, leaving broadcast range of a confinement zone, or by actual location determination and mapping against both permitted and exclusion zones. Alternatively, passive devices may simply record and transmit location information for later or real time comparison with permitted and excluded zones at a remote system.

Many devices have been proposed and employed for such uses. Among the most common are multi-component systems. Such systems typically include a wearable radio frequency (RF) bracelet that communicates with some type of base device. This may be a fixed base system with access to a telephone line that places a telephone call to a monitoring service anytime the RF signal is not detected. Alternatively, it may be a portable base equipped with GPS location technology that detects the presence of the bracelet RF signal and also tracks movements and periodically communicates, typically through wireless phone technology, to report those locations. These devices may also have the capability of displaying text messages from the monitoring officer or agency on an LCD screen. Some base attachments have attempted to utilize voice recognition technology to provide verification of the identity of a person present and responding to a phone call placed through the base unit.

Generally absent from these systems is the ability for real time or near real time communication directly between a remote system and the locator device associated with the individual. In addition, the component costs of custom devices is unnecessarily high compared to the prices available for mass market cellular telephone and GPS technology. Many systems require dedicated phone lines, require the monitored individual to wear or carry obtrusive hardware, require additional hardware for monitoring personnel, lack adequate battery life for multi-day usage, are subject to drift due to GPS signal errors, and lack a method for confirming receipt of messages sent between monitoring personnel and a monitored individual.

Accordingly, there is a need for an individual tracking system that can be deployed with software capable of running on a wide variety of devices and is therefore largely device agnostic.

There is also a need for an individual tracking system that does not require the use of dedicated phone lines or obtrusive hardware. There is also a need to provide real time or active tracking and active notification to monitoring personnel.

There is a further need for a system with easily configurable rules and with easily updated and connected location data.

There is an additional need to provide a method for shorter response times to alarm conditions than can be economically provided by municipal police and private security services.

SUMMARY OF THE INVENTION

Accordingly, it is an object of the invention to provide a largely device agnostic system for monitoring of individuals.

It is further an object of the invention to implement individual tracking capability without the necessity of obtrusive hardware or dedicated phone lines.

It is yet another object of the invention to provide an individual tracking system that does not require specialized hardware for monitoring personnel.

It is a further object of the invention to provide active or real time location information concerning monitored individuals and to provide active notification to monitoring personnel.

It is another object of the invention to provide a method for confirmed communications between monitoring personnel and a monitored individual.

It is yet a further object of the invention to provide an easily adjustable and tamper resistant wearable tracking device.

It is an additional object of the invention to provide a system that allows the implementation of many rules, and which is easily updated with location data, and can self correct location data.

It is a further additional object of the invention to provide a responsive network to provide assistance to monitored individuals signaling an alarm condition.

BRIEF DESCRIPTION OF THE DRAWINGS

FIG. 7C is a perspective view of a locking pin utilized to hold the strap of FIG. 7B in place.

FIG. 7D is a rear perspective view of a monitoring device according to the present invention.

FIG. 9B is a pop up text window reflecting the graphical data of FIG. 9A.

DETAILED DESCRIPTION OF THE INVENTION

Figure 1:
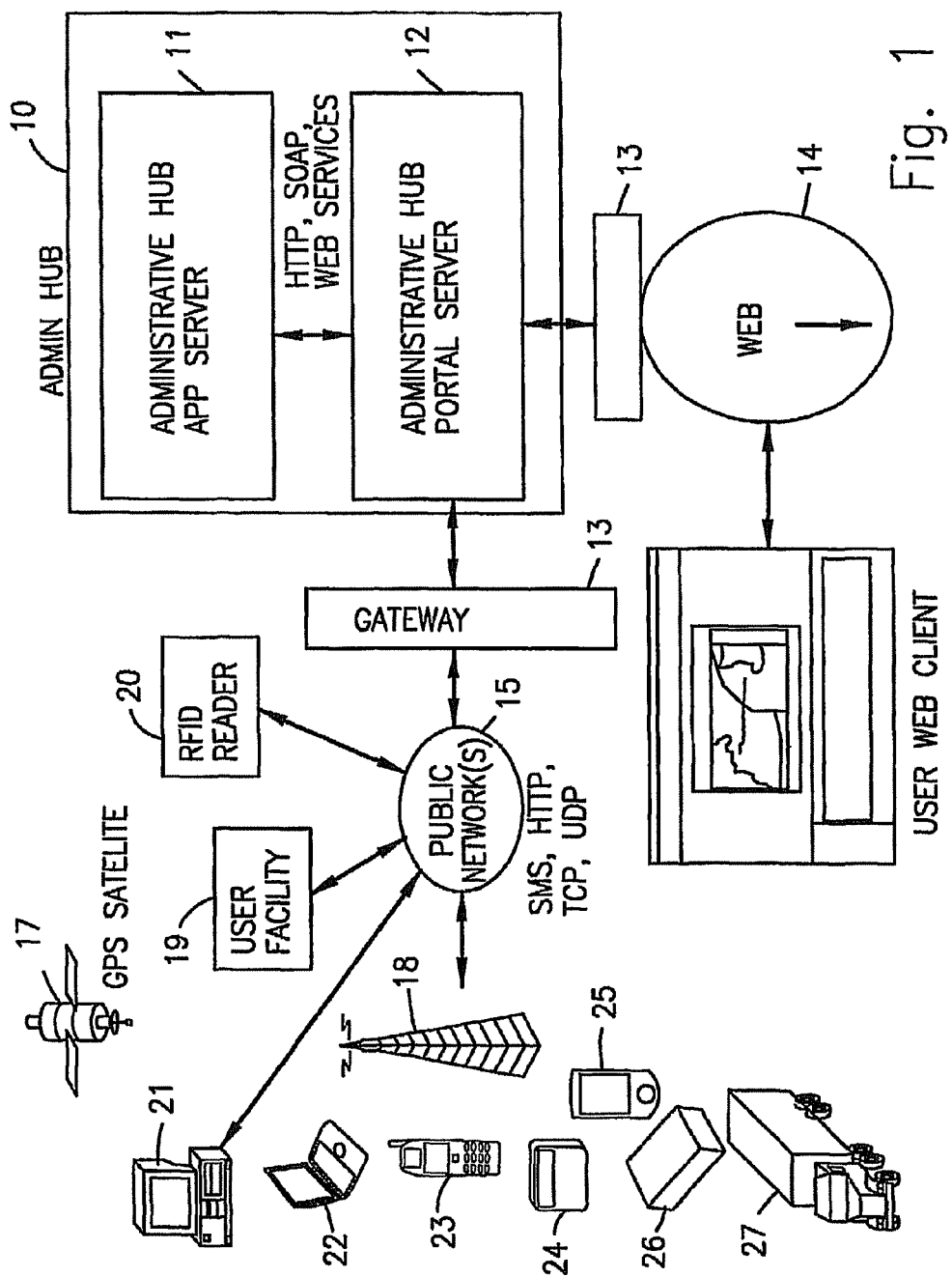
FIG. 1 is a schematic diagram showing the communication paths of components utilized in the invention.

Turning then to FIG. 1, a schematic overview of the communication path utilized in the present invention is illustrated. Control of the invention is preferably maintained at one or more administrative hubs 10 running application server 11 functionality and portal server 12 functionality. The portal server 12 will communicate through gateways 13, generally routers or a location aggregator, with the Internet 14 or some combination of public networks 15, possibly including the Internet and telephone networks. Communications are then directed to and/or from a wide variety of devices with respect to the administrative hub 10. For instance, an RFID reader 20 may detect and report the presence of an RFID tag. The administrative hub 10 may generate a message to a controllable device user at facility 19 and receive a confirming acknowledgement. A user of the invention may obtain information via personal computer 21, laptop computer 22, cell phone 23, Blackberry 24, Palm Pilot 25 or other digital communication device. The tracking device may be in a wearable ankle bracelet box 26, installed in a vehicle 27, or operated on GPS enabled mobile communications devices such as Palm Pilots 25, Blackberrys 24, cell phones 23, or even on appropriately configured laptop computers 22. If the tracking software is installed on these or similar devices, then location information generated from GPS satellite 17 and confirmed by assisted GPS location data for cell tower triangulation, together with any other types of data collected by the mobile communication device, is periodically transmitted to the administrative hub 10. A user of the system with access via a web enabled device is able to graphically display a variety of tracking device information utilizing web client 16. In addition, the user may generate messages to the administrative hub 10 or to any of the described communication enabled devices. Because the system is implemented in a device agnostic fashion, it is contemplated that the system will operate with a plurality of types of devices employed by both users who access data and by monitored persons.

Figure 2:
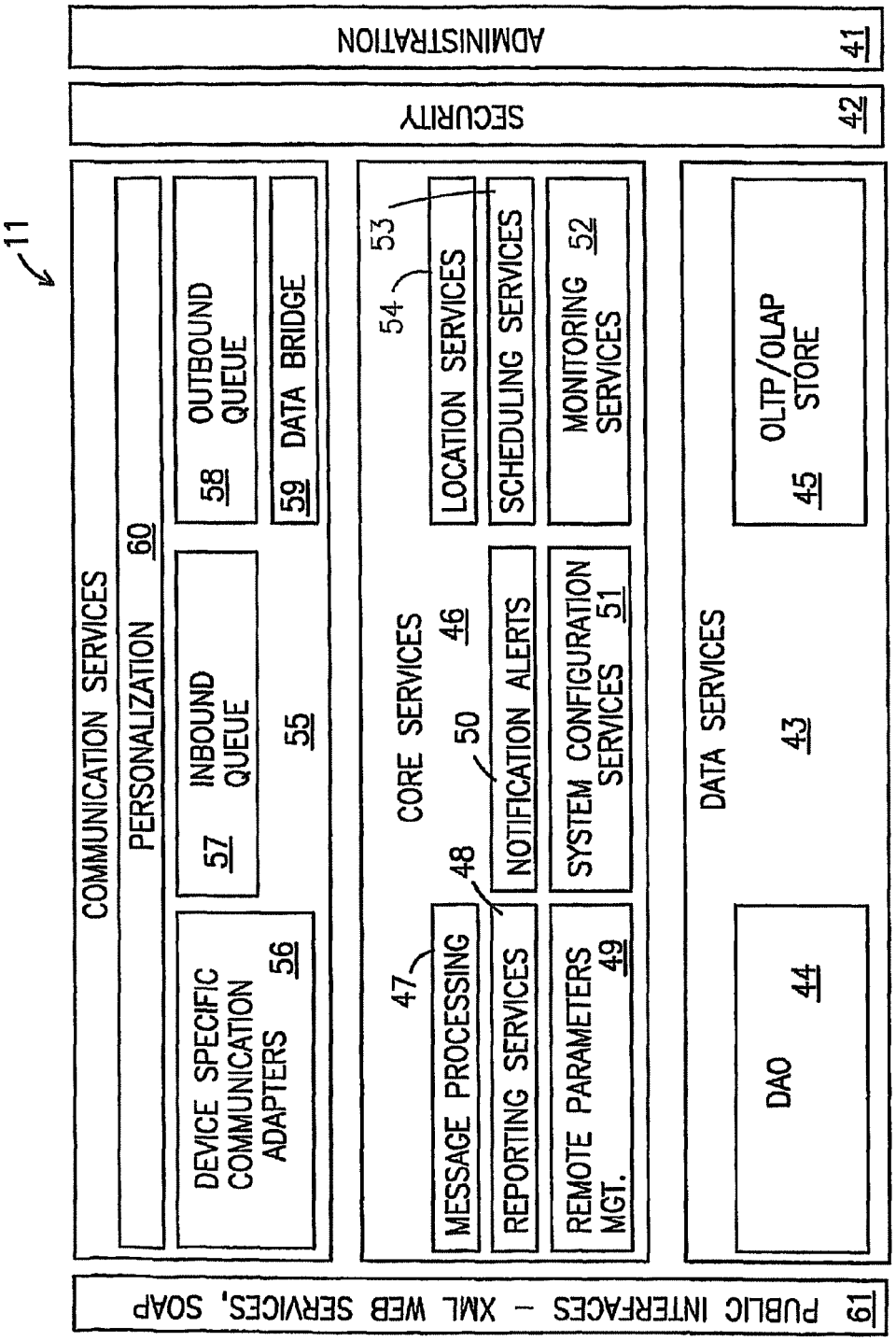
FIG. 2 is a block diagram of the functional architecture of an administrative hub server.

Turning then to an examination of the system components in greater detail, the logical architecture of a representative administrative hub application server 11 is shown in FIG. 2. This server has a standard administration 41 and security 42 functionality. The three principal categories of the services provided by the application server 11 are data services 43, core services 46, and communications services 55. Data services 43 include data housed in OLTP (Online Transaction Processing) or OLAP (Online Analytical Processing) relational or multidimensional databases 45 and data access objects (DAO) 44 to allow data access mechanisms to change independently of the code that uses the data. Core services 46 principally comprise message processor 47 for parsing and either acting upon or forwarding incoming messages for action and building and formatting outgoing messages in appropriate packet format; reporting services 48 for building reports from event logs stored in data services 43 and organizing the data for transmission to portal server 12; remote parameters management 49 for storing and managing parameters such as time intervals for a mobile unit to take location fixes and for initiating communications with administrative hub 10, and intervals for battery charge testing and reporting and battery charge requirements; notification/alerts 50 for configuring conditions that will generate alerts and reports, including persons to be notified for types of events, immediate or delayed timing for those notifications, and the communication methods to be employed in notifications; system configuration services 51 to hold parameters defining the system and user preferences which may include language choice, time zone, and the like; location services 54 to convert data from mobile units to position, and geocoding to or from a particular address, as well as performing assisted GPS location calculations and any necessary drift correction; scheduling services 53 for managing times including regular schedules for exclusion and inclusion zones, as well as special permissions or allowed variations from usual schedule, and required appointments at particular addresses; and monitoring services 52 for comparing reported locations against rules for the monitored individual's locations and generating appropriate information to the notification/alerts module 50 in the event of violations. The communication services component 55 includes inbound and outbound message queues 57, 58; communication adapters 56 to allow messaging with a variety of devices; data bridge 59 to permit data from core services to be formatted into outbound messages, and inbound messages to be formatted for access by core services 46; and personalization 68 to permit users to specify custom reports and preferred screen displays. Finally, an interface 61 such as XML protocol for accessing web services is provided.

Figure 3:
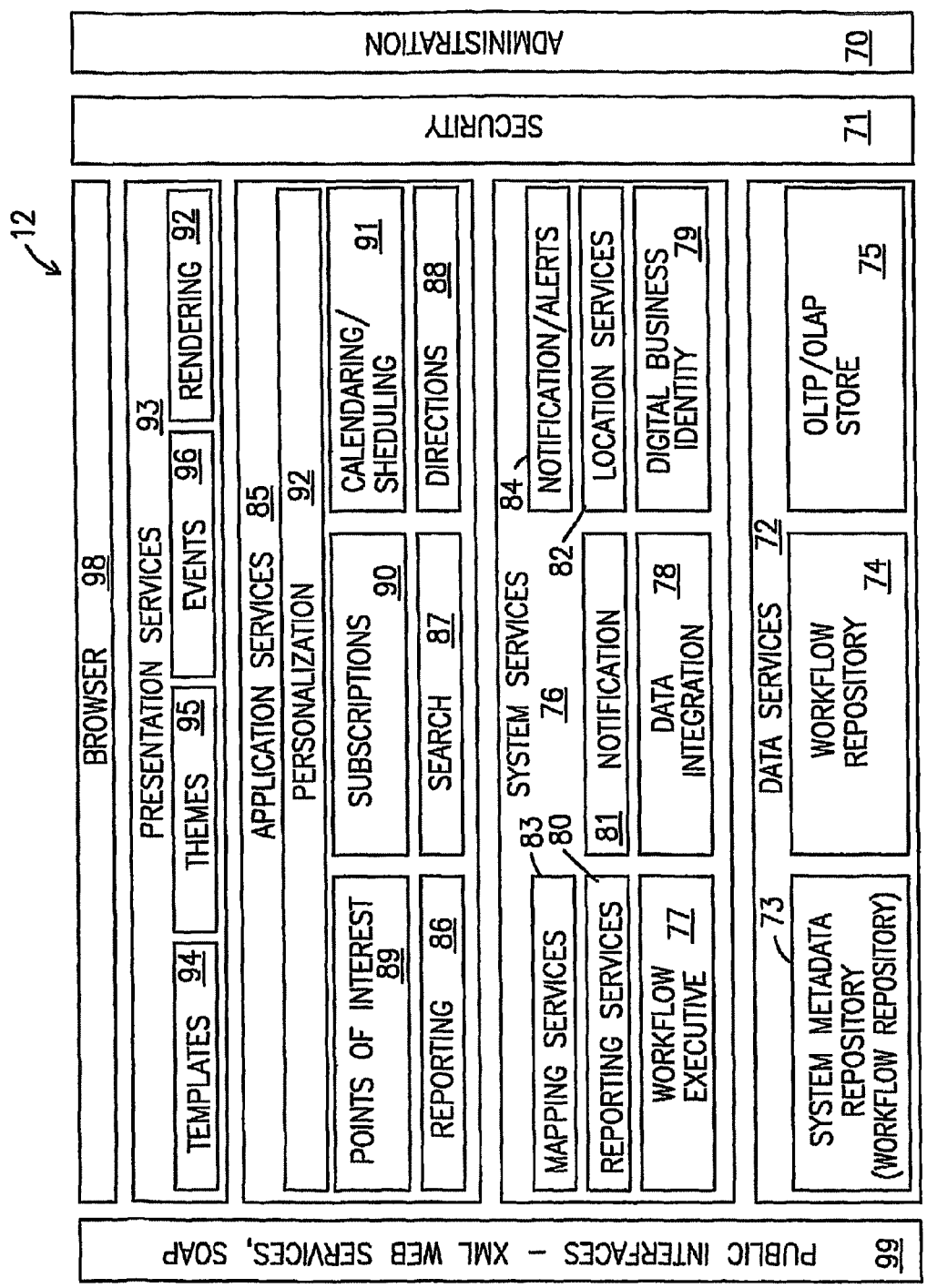
FIG. 3 is a functional architecture diagram of an administrative hub portal server.

FIG. 3 shows a similar logical architecture of an administrative hub portal server 12 which once more has standard administrative 70, security 71 and interface 99 modules. The principal functionality of portal server 12 may be divided into data services 72, system services 76, application services 85 and a browser 98. Data services 72 principally comprise a repository for data needed to reply to inquiries from users accessing the system using their web client 16 (shown in FIG. 1).

Principal components of data services 72 include system metadata repository 73 holding information with respect to the system components so that they may be accessed when needed to carry out actions; workflow repository 74 queuing the actions to be carried out; and OLTP/OLAP storage 75. System services provide a number of modules corresponding to core services on the application server including reporting services 80, notification alerts 84, and location services 82. In addition, system services provide mapping services 83 for rendering locations on graphical maps, workflow executive 72 for parsing actions in the workflow repository 74 and commencing execution of those actions, data integration 78 for merging structured and unstructured data into a useful form such as XML for use by the system, and digital business identity 79 for holding user management information utilized by the system's access control logic. The application services 85 include display related personalization 92; search functionality 87; reporting 86; points of interest 89 for assigning descriptive names to physical locations in lieu of addresses; subscriptions 90 for allowing users to specify types of information to receive, such as whenever a new subscriber or offender is added for monitoring, whenever a mobile unit is disabled, or other types of events separate from the violation type notification/alerts; directions 88 for facilitating navigation to locations; and calendaring/scheduling 91 to communicate schedule information with scheduling services 53 on application server 11. Presentation services 93, principally comprising templates 94, themes 95, and rendering 97, provide for enhanced screen displays presented in browser 98. Events 96 translates user keystrokes and mouse clicks into workflow actions.

Figure 4:
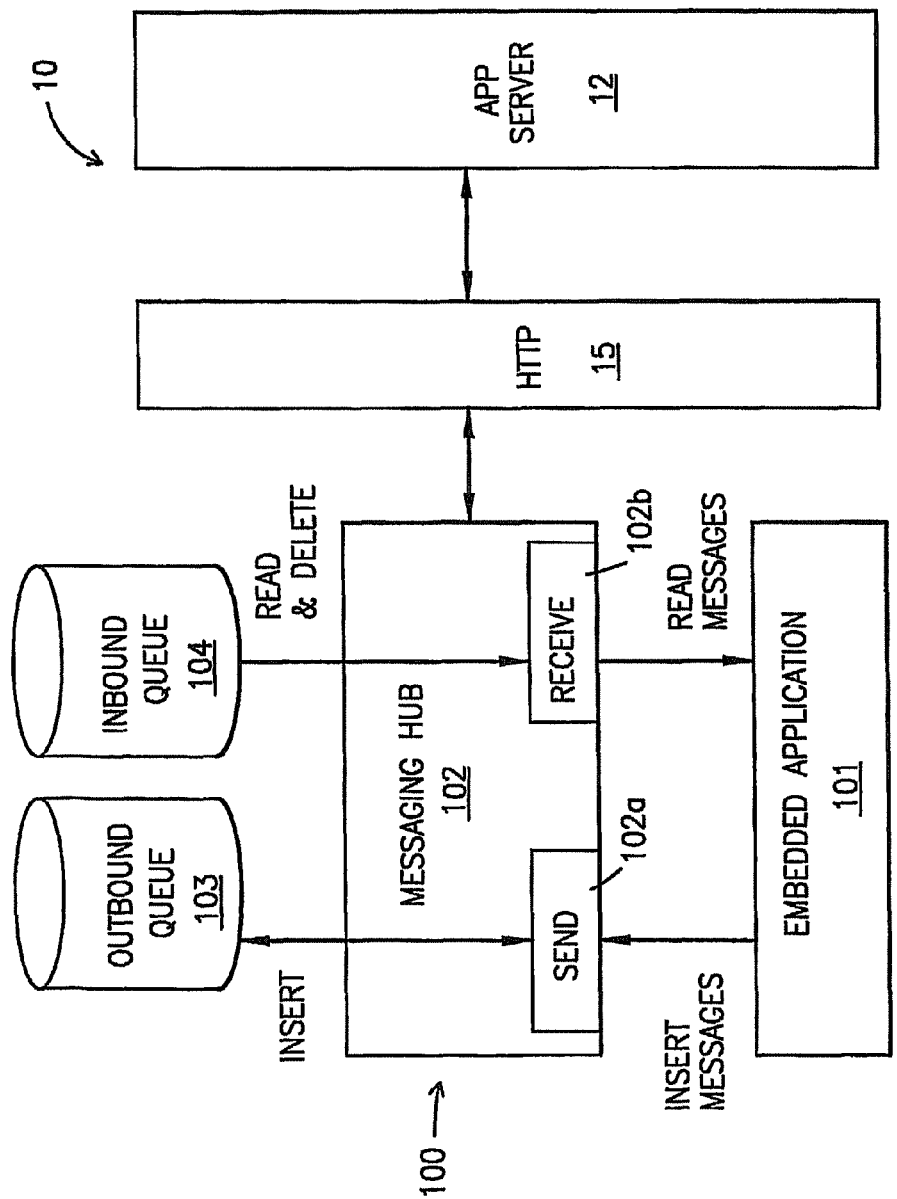
FIG. 4 is a schematic diagram reflecting the processing of communications by a portable device according to the present invention.

FIG. 4 shows an overview of messaging between application hub 10 and user device 100. A message may be generated by application server 12 and then communicated via Internet and typically public cellular network 15 to device 100 where it is inserted in the inbound message queue 104. Messages are then read into the messaging hub 102 which corresponds to communication services 114 shown in FIG. 5 and deleted from the inbound queue 104. Received messages are then processed for message type and appropriate message data is transmitted to embedded application 101 in the device 100. Similarly, the embedded application 101 may generate acknowledgement for messages which are transmitted to messaging hub 102, formatted and inserted in outbound message queue 103.

Figure 5:
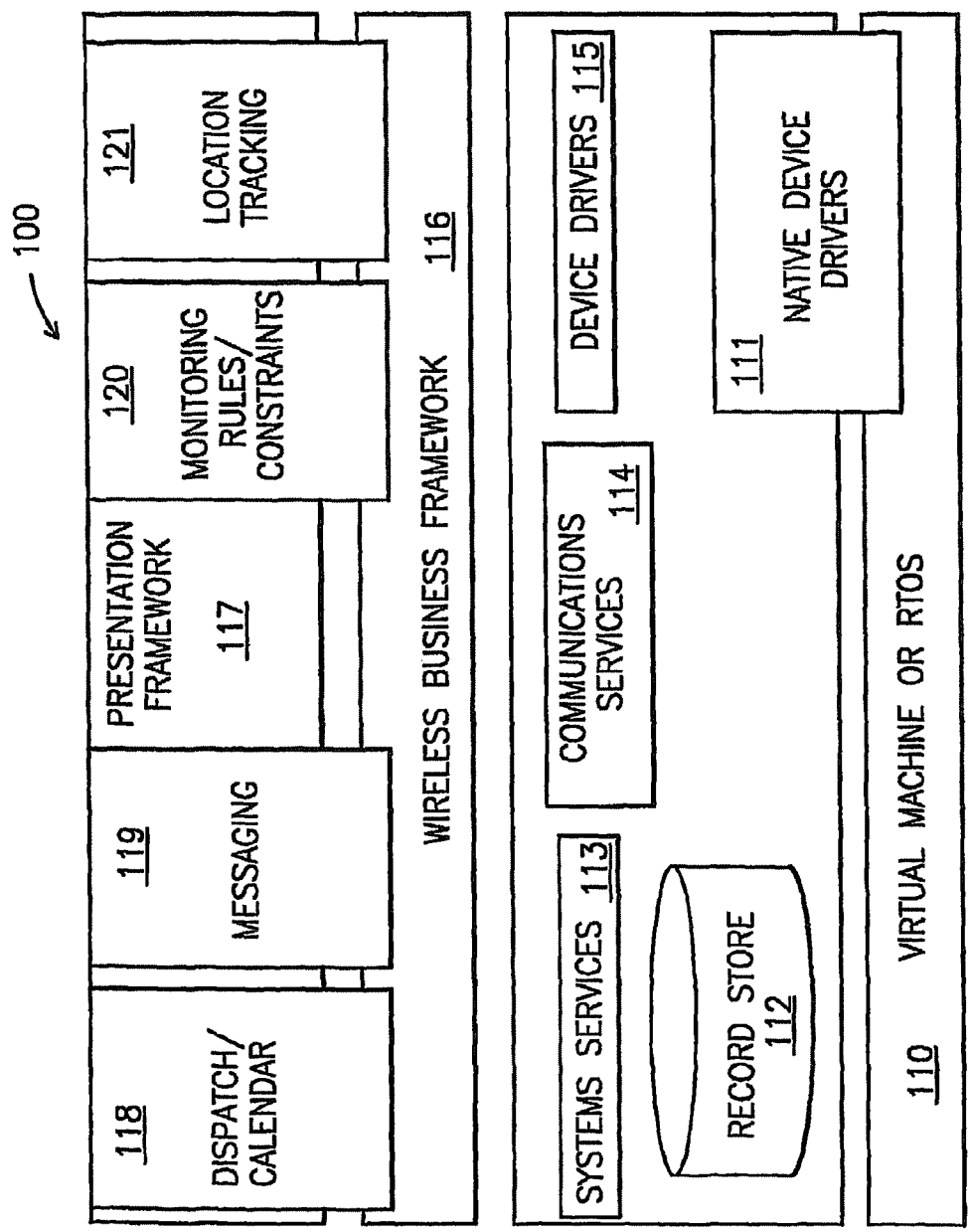
FIG. 5 is a functional architecture diagram of a wearable tracking device according to the present invention.

The logical architecture of a representative device utilized in the invention is reflected in FIG. 5. A preferred device uses a real time operating system (RTOS) or a virtual machine software implementation of a desired CPU and native device drivers 111 to permit operation of the system with a wide variety of devices 100. In even the more basic tracking devices typified by vehicle tracking 27 or offender tracking 26 devices, there are device drivers 115 to interface with much of the hardware shown in FIG. 6, systems services 113 to monitor device status 112 or to generate alerts, and communication services 114 to transmit stored data and alerts as described in connection with FIG. 8. Wireless business framework 116 implements the confirmed delivery of messages, as also explained in connection with FIG. 8, while presentation framework 117 contains dispatch module 118, which effectively is a calendaring or scheduling functionality, and messaging 119 which is only available on more advanced devices such as handhelds, phones with LED displays, or computers. Monitoring rules and constraints 120 are implemented to generate active monitoring notifications while location tracking 121 generates GPS and assisted GPS location data.

Figure 6:
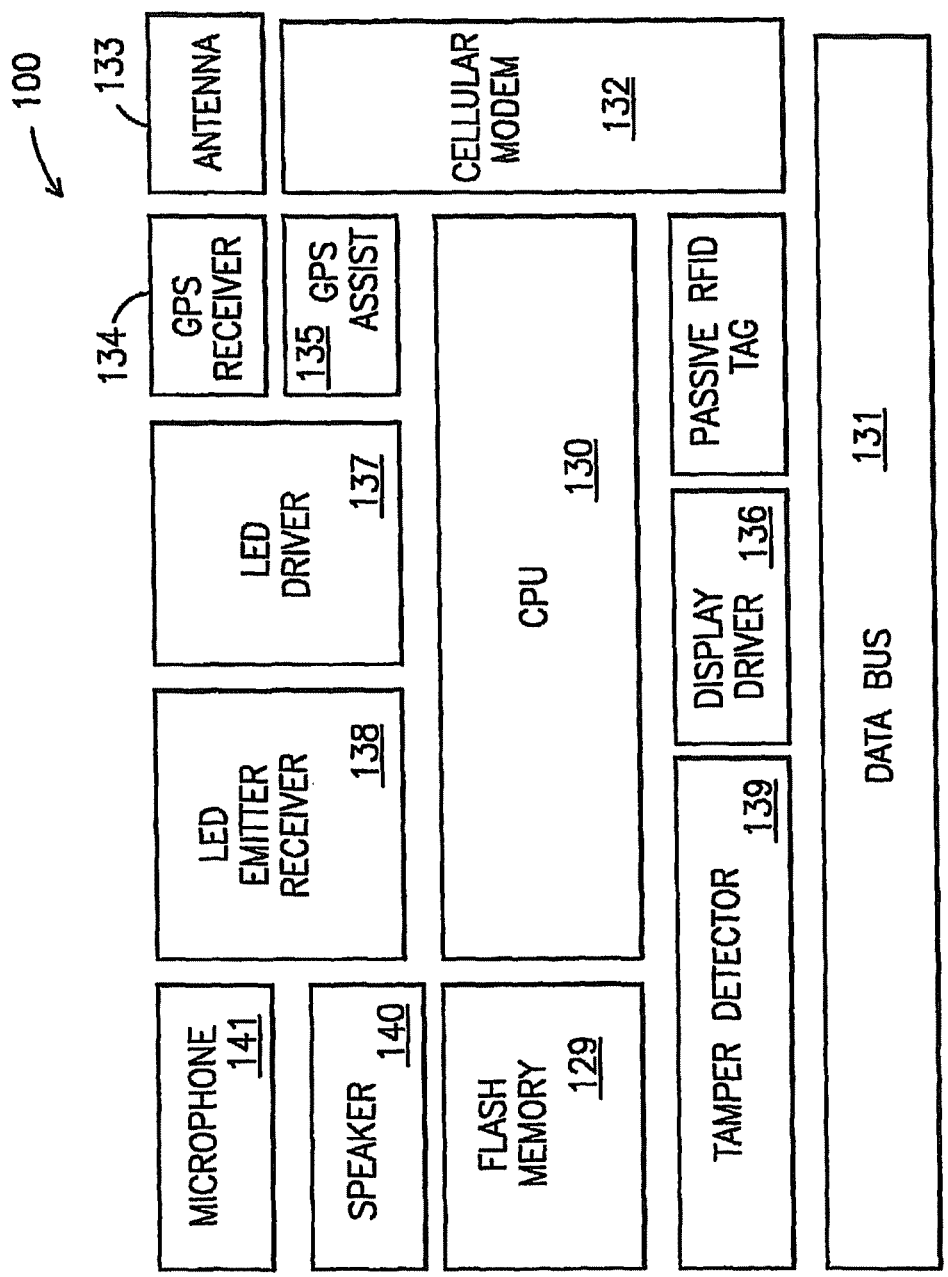
FIG. 6 is a high level electrical block diagram of a wearable tracking device according to the present invention.

FIG. 6 is a high level block diagram of a device 100 used in the invention. Typically, the device is based upon a GPS enabled cell phone, principal components of which are flash memory 129, CPU 130, data bus 131, cellular modem 132, antenna 133, GPS receiver 134, display driver 136, speaker 140, and microphone 141. The operating system or virtual machine software, as appropriate to the device, may be installed in flash memory 129 and operates in connection with CPU 130 to present a standard device profile to the system. Communications are transmitted from the CPU through the data bus 131 to cellular modem 132 and broadcast in the form of digital packets via antenna 133. Similarly, incoming messages travel in the reverse sequence.

The GPS receiver 134 is utilized to generate location information. Because GPS location requires line of sight access to GPS satellites 17, and because GPS location is sometimes subject to erroneous results due to drift or temporary satellite misorientation, GPS assist 135 may be added to the device or the cellular network. Assisted GPS generates location information based upon signals received from nearby cellular communication towers 18 and without correction is often only accurate to within several hundred feet rather than the GPS location accuracy of only several feet. Nonetheless, assisted GPS provides valuable location confirming information as well as at least general location information when line of sight access to GPS satellites is unavailable.

Alternatively, location information may be provided by a location aggregator. The location aggregation service may be provided by a cellular network provider or an entity operating a gateway in connection with the cellular network or other broadcast communication provider. Many cellular networks are now capable of determining the location of GPS enabled cellular handsets with some degree of accuracy, particularly handsets that facilitate assisted GPS such as those using Qualcomm 6050 or 6250 microprocessors which permits the network to use AFLT. While the 6250 microprocessor can operate autonomously to determine the co-ordinates of the handset, both of the Qualcomm processors can also operate in response to a cellular network query, or by generating a their own location query, to cause the network to acquire the GPS data received by the cellular handset, and to utilize Advanced Forward Link Triangulation (AFLT) or other cellular network information, to produce an assisted GPS geolocation for the handset.

In a further refinement, the GPS and cellular network data may be processed by the location aggregation service for accuracy. For instance, location information data may be processed utilizing noise processing theorems to correct for bad data such as drift caused by a GPS satellite wobble, or the effects of changes in signal reflection and absorption caused by varying conditions such as locations in urban canyons, the woods, or beneath heavy cloud cover, and atmospheric ionization changes from day and night. Information as to the geolocation of the handset is then communicated by the location aggregator to the administrative hub, and in appropriate instances may also be communicated to the handset.

While the display driver 136, microphone 141 and speaker 140 may be disabled or removed from vehicle location 27 or offender bracelet 26 constructions, other hardware may be added. For instance, in the case of an offender bracelet 26, tamper detector 139 and LED driver 137 and LED emitter receiver 138 are added to provide redundant tamper indicators as explained below in connection with FIG. 7.

A preferred offender tracking device 26 is illustrated in FIGS. 7A-7F. The principal components of tracking device 26 are lock bracket 144 as shown in isolation in FIG. 7F, a strap 150 shown in isolation in FIG. 7A, and main housing 170 shown in bottom view in FIG. 7D and top phantom view in FIG. 7B. Turning first to the strap 150 of FIG. 7A, a representative strap 150 might be manufactured from plastic molded over optical cable 151 and light guide 153. The strap will preferably have a light guide/connector 152, apertures 154 to accept fasteners, and apertures 155 to receive locking posts. An alternative strap design includes a flexible battery within the strap. Optical cable 151 may still be included in the strap 150, and significant power resources for the device can be located within the strap. This results in the main housing 170 no longer having to contain the entire power supply, and by utilizing a smaller battery within the housing, the size of the housing may be reduced, resulting in a device that is more easily worn.

Figure 7A:
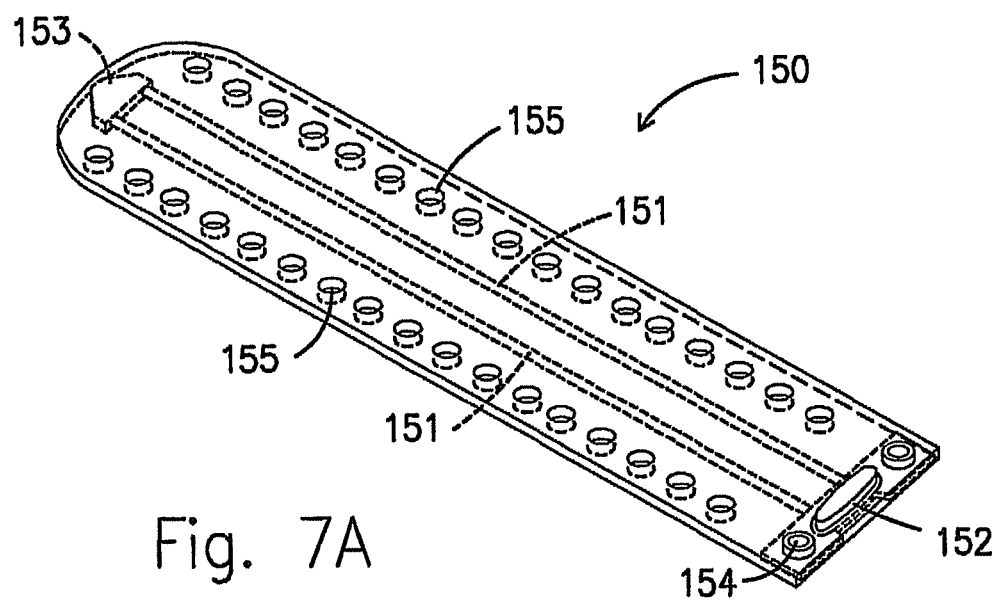
FIG. 7A is a perspective view of a tamper resistant strap for use with a wearable tracking device according to the present invention.
Figure 7B:
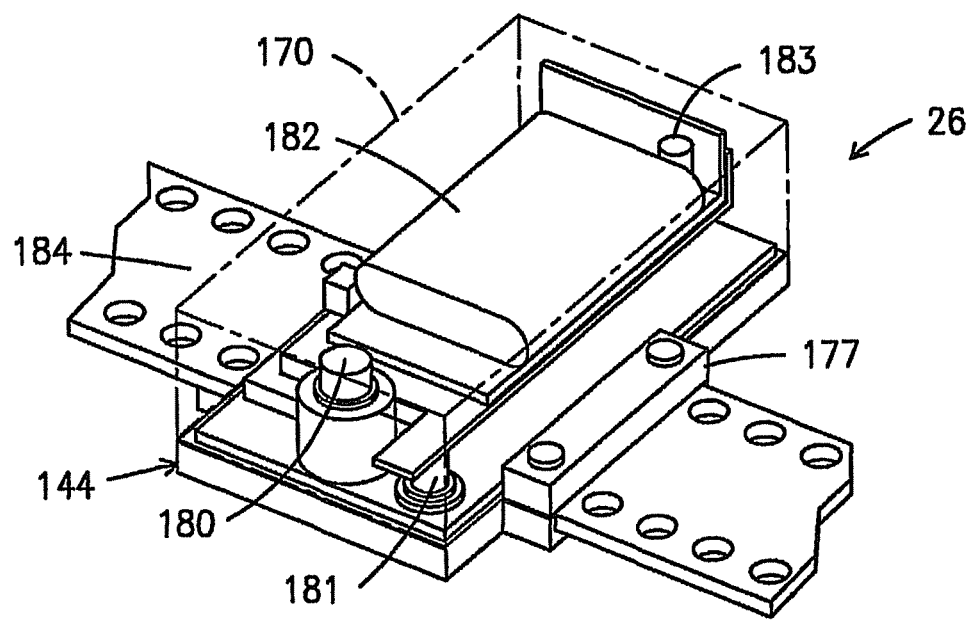
FIG. 7B is a perspective view of a wearable device according to the invention with strap affixed.

An exemplary battery technology that may be employed in such a strap is a thin flexible battery using NECs organic radial battery technology. Turning then to FIG. 7D, it can be seen that fasteners 156 have been received through apertures 154 of strap 150 and thereby fasten the strap 150 to bottom of main housing 170. As shown in FIG. 7B, main housing 170 contains recharge connector 180, tamper sensor switch 181, battery 182, antenna 183, and generally the components 184 reflected in FIG. 6. When used without a power strap, the battery 182 is preferably a long life battery which has a life of up to approximately 21 to 30 days when used for offender monitoring in monitoring units having current efficient circuitry and antenna design, and effective power management algorithms to minimize the number and duration of transmissions from the unit and the intensiveness of calculations carried out in the mobile unit. This permits monthly visits to a probation officer with the necessity of recharging the battery by the offender only once, if at all.

When used with a power strap, the battery in the strap 150 preferably has these long lived characteristics, and the battery 182 within the housing 170 may be simply a short term back-up power supply, to operate the device temporarily if the power strap is damaged or disconnected. The storage in device 100 is sufficient to store messages and GPS location recordings for up to about two weeks depending upon the frequency with which GPS location readings are recorded.

The bottom of main housing 170 in FIG. 7D shows a variety of features including opening 171 for tamper sensor 181, opening 172 for recharge connector 180, rearward facing hooks 173, lens opening 174 to transmit light from a diode to the light guide connector 172 of strap 150 and forward lip 175 defining cavity 176. The side walls for cavity 176 have apertures 177 to receive locking pin 160 shown in FIG. 7C.

Figure 7E:
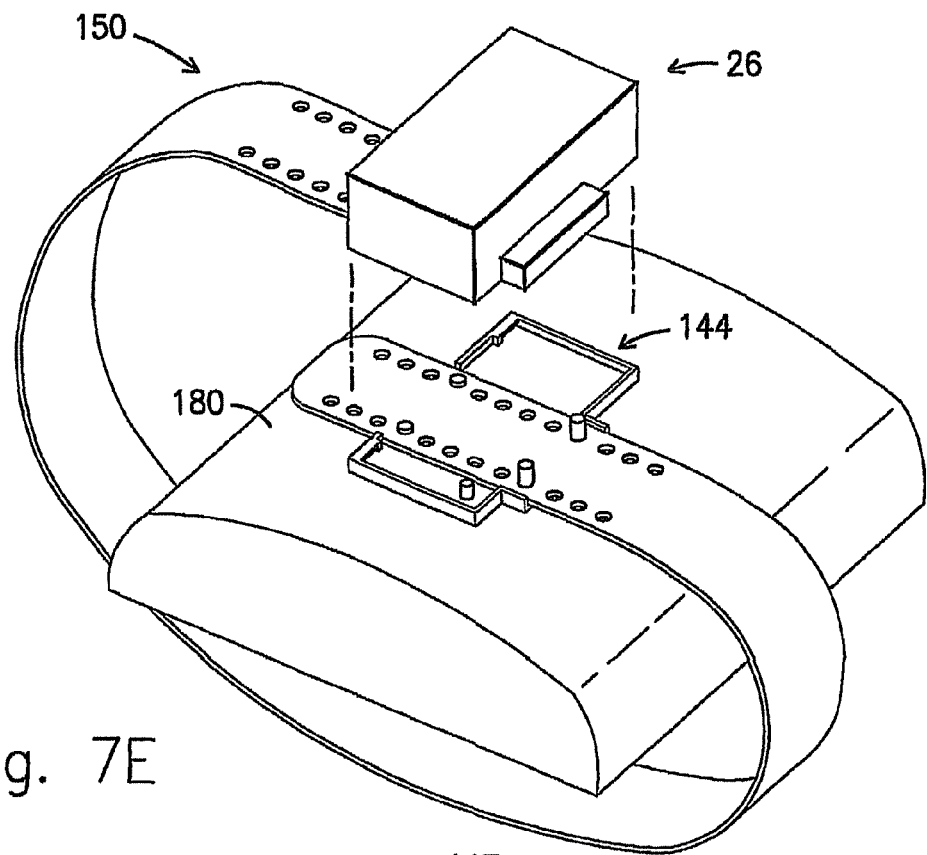
FIG. 7E is a perspective view showing the method of attaching a monitoring device of the present invention to the wearer's leg with the device, attached strap and lock bracket.
Figure 7F:
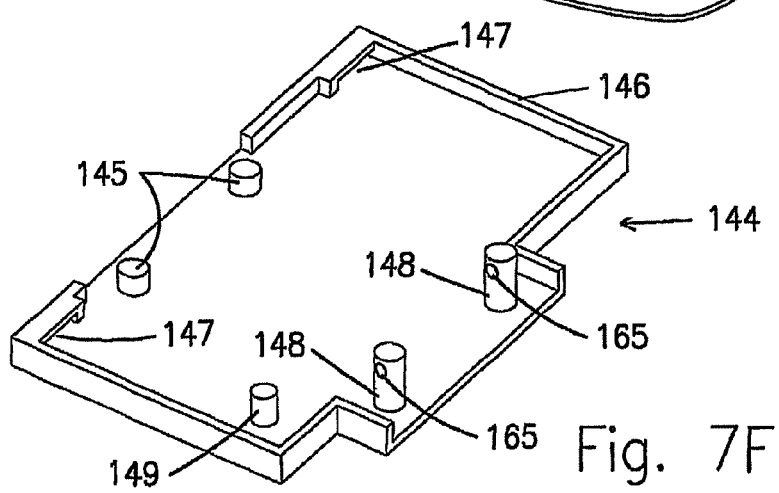
FIG. 7F is a perspective view of a lock bracket base according to the present invention in isolation.

To attach the device 26 as shown in FIG. 7E, the lock bracket 144 is placed on the offender 190. Accordingly, the bottom surface of the lock bracket 144 is preferably made with comfortable to wear surface. The top surface of lock bracket 144 has an outer flange 146 to receive housing 170 and a plurality of upstanding pins. At one end are two relatively short pins 145 that interface in the strap openings 154 that receive fasteners 156. At the opposite side of the face of lock bracket 144 are two taller pins 148 that are received in apertures 155 of strap 150 after it encircles the offender's arm or leg 190. These taller pins 148 have lateral apertures 165 to receive the locking pin 160. Also shown is pin 149 that is received in aperture 171 to activate the tamper sensor switch 181.

Thus, to fit the device 26 to the offender, lock bracket 144 is placed on the offender's leg 190. The light guide connector 152 end of the strap 150 is secured to the housing 170 as by screws 156. The strap 150 is placed so that the unattached end is received over posts 145, 148. The strap is then wrapped around the offender's leg 190, and the main housing hooks 173 are received in flange recesses 147 on lock bracket 144, while posts 148 extend upward into cavity 176. Then locking pin 160 is passed through openings 177 and pin holes 165 so that the pin head 163 extends from one side of front lip 175 and base 161 extends from the other side with lateral section 162 extending therebetween. In the event that the offender should attempt to remove the pin 160, it will break at breakpoint 164 and the tamper detector will be activated. Similarly, if the optical cable 151 of strap 150 is cut, the tamper detector will be activated. Finally, if the main housing 170 is removed from lock bracket 144, the tamper sensor switch 181 will be activated. In any of these instances, the device 26 will generate a message to the administrative hub 10 advising of the tampering event.

An effective tamper detector to ascertain whether there has been a breach of the housing 170 may combine a light sensor that is activated when light enters the housing and an electromagnetic field sensor that is activated if metal components of the housing are dislocated. A sophisticated tamper detector used with the optical cable may utilize an LED driver 137 and one or more LEDs to emit at least two different frequencies of light in alternating or random sequence through the lens opening 174 into the light guide connector 152 and outbound on a first length of optical cable 151 to light guide 152 and back inbound on the second length of optical cable 151. Simultaneously, the LED receiver is informed of the frequency being emitted, and if either no light or the wrong frequency light is detected inbound, then a tamper alert is generated.

It will be appreciated that in securing the device 26 to an offender, it is not necessary to cut strap 150. Instead, the strap will fit a substantial range of offender leg sizes and requires no special tools to secure the unit on the offender's leg. Prior art devices have generally required the strap be cut to length and in the event that optical cable is utilized for tamper indication, the difficulties of accurately splicing the cable not only requires special tools, but also is likely to be sufficiently defective that false tamper alerts may be generated. Furthermore, when the device is removed from an offender, only the pin 160 is destroyed, so that the strap 150 may be reused.

Figure 8:
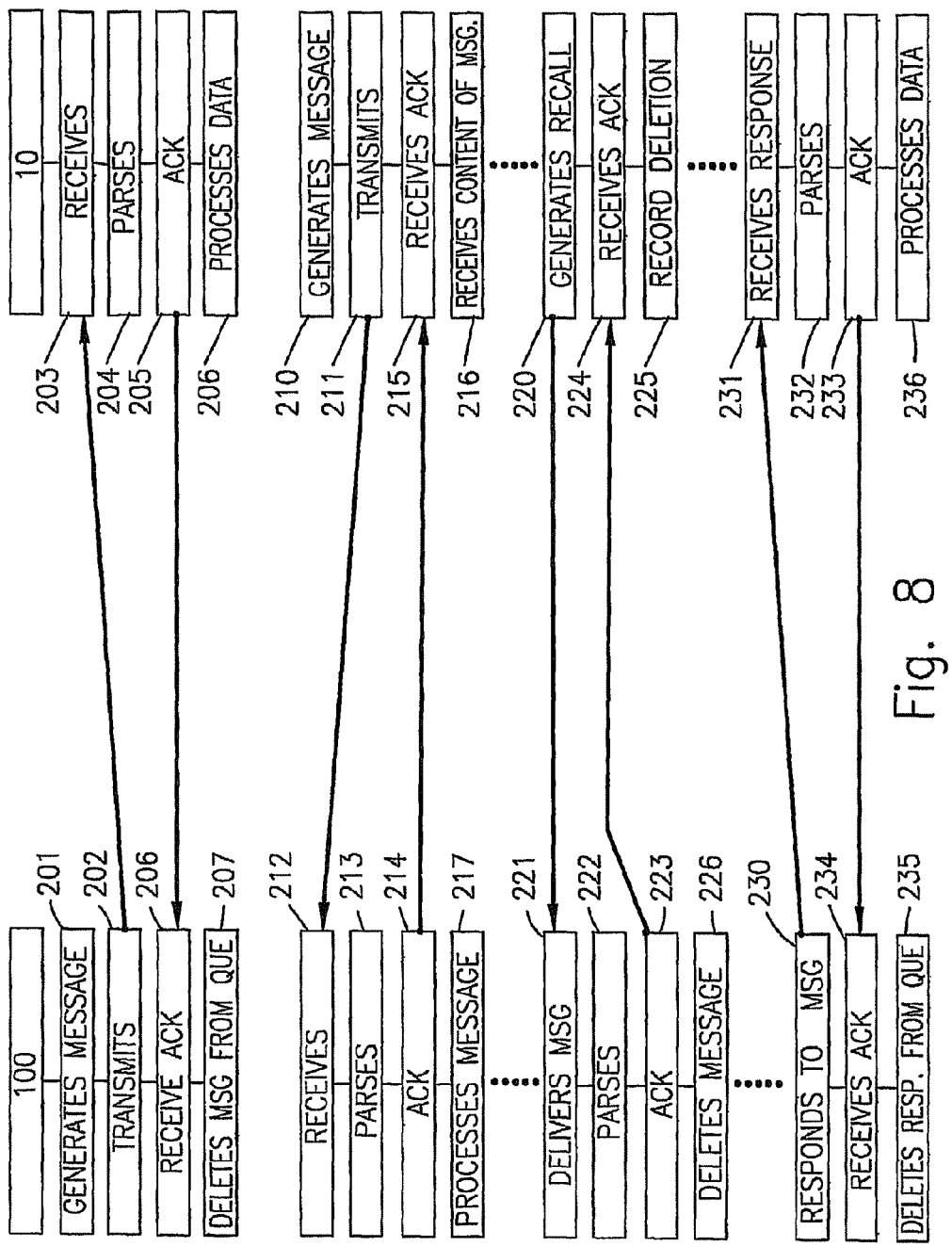
FIG. 8 is a schematic and flow chart reflecting a confirmed communication protocol that may be implemented according to the invention.

Turning then to FIG. 8, the messaging protocol providing for confirmed messaging is illustrated. First, a device 100 generates message 201. This message may be generated as a result of an alarm condition such as tampering, low battery, or entry into an exclusion zone, or alternatively may be simply a regularly scheduled transmission of location data as the device will be configured to take location readings periodically, typically in intervals of about one to five minutes, and to transmit those readings in batches, typically about every thirty minutes, preferably in a proprietary data packet. Such a data packet preferably has a header identifying message type, a security token, and message data. After the device 100 generates message 201, the message is transmitted 202 and received 203 by administrative hub 10. The data packet is parsed 204 to confirm a message type, the sending device, that security protocols are satisfied, and to determine that the data is not corrupt. Administrative hub 10 then sends an acknowledgement 205 to device 100 which receives the acknowledgement 206 and deletes the message from its outbound message queue 207. If the administrative hub determined the message was corrupt, it would request that the message be resent. If the device 100 did not receive an acknowledgement within a predetermined time period, it would resend the message.

It is also possible for messages to be generated at the administrative hub 10. These messages might actually be entered by systems personnel at the administrative hub 10 or by monitoring personnel interfacing with the administrative hub via user web client 16 or other suitably enabled device. Accordingly, a typical message generated might be from a probation officer advising an offender with a display equipped monitoring device that he has a court date at a particular time and place; or a message from a dispatcher to a pickup/delivery vehicle advising of an additional address to include on a route; or an administrative change to redefine an exclusion zone or alter a parameter of operation such intervals for taking and reporting location readings. Once the message is generated 210, the messaging hub transmits 211 the message which is received 212 by device 100. The device 100 parses 213 the message for message type and confirms appropriate security token is present and that the message is not corrupt. Then the device 100 generates an acknowledgement 214 which is sent to messaging hub and received 215. The administrative hub 10 then records confirmation that the message was received by device 100. The device 100 proceeds to process the message data 217.

When the administrative hub 10 is messaging device 100 with user display means such as a LED screen, messages may be sent which request a response. For instance, probation officer might ask an offender if he needs a ride to a court hearing. A dispatcher might ask a delivery/pickup person if he can make an extra pickup or delivery, and in either case request a reply. In the event that the message is received by the device 100 but there has been no reply, it is possible for the administrative hub to issue a message recall 220. When that recall is received 221 by device 100, it parses recall message 222, generates an appropriate acknowledgement 223, and proceeds to delete the message. The administrative hub receives the acknowledgement 224 and records the deletion of the message 225.

Alternatively, if the device user responds to the message 230, the response is sent to the administrative hub 10 and received 231. Then the response is parsed 232 and acknowledged 233, and the administrative hub proceeds to process the data in the response, perhaps informing a dispatcher that the requested pickup or delivery has been accepted by the pickup/delivery driver. The device 100 receives the acknowledgement 234 and proceeds to delete the response from its messaging queue 235. Thus, the invention provides for a robust two-way messaging system with confirmed messaging delivery and message recall capability. The administrative hub 10 has the capability of sending inquiries to the device 100 in order to return information regarding device status and location information. The message confirmation protocols assure that a reliable audit trail can be maintained by the system.

The administrative hub 10 has the capability of sending alerts to a variety of devices. For instance, the hub 10 can provide graphic data and text messages to user devices with screen displays; it can send email messages to email accounts; it can send text messages; it can send fax reports or alerts; and it can generate voice alerts to be received by telephone or RF enabled devices. Thus, a probation officer can receive a voice alert generated by the system over a regular telephone when a high priority alarm warrants such communication.

Figure 9A:
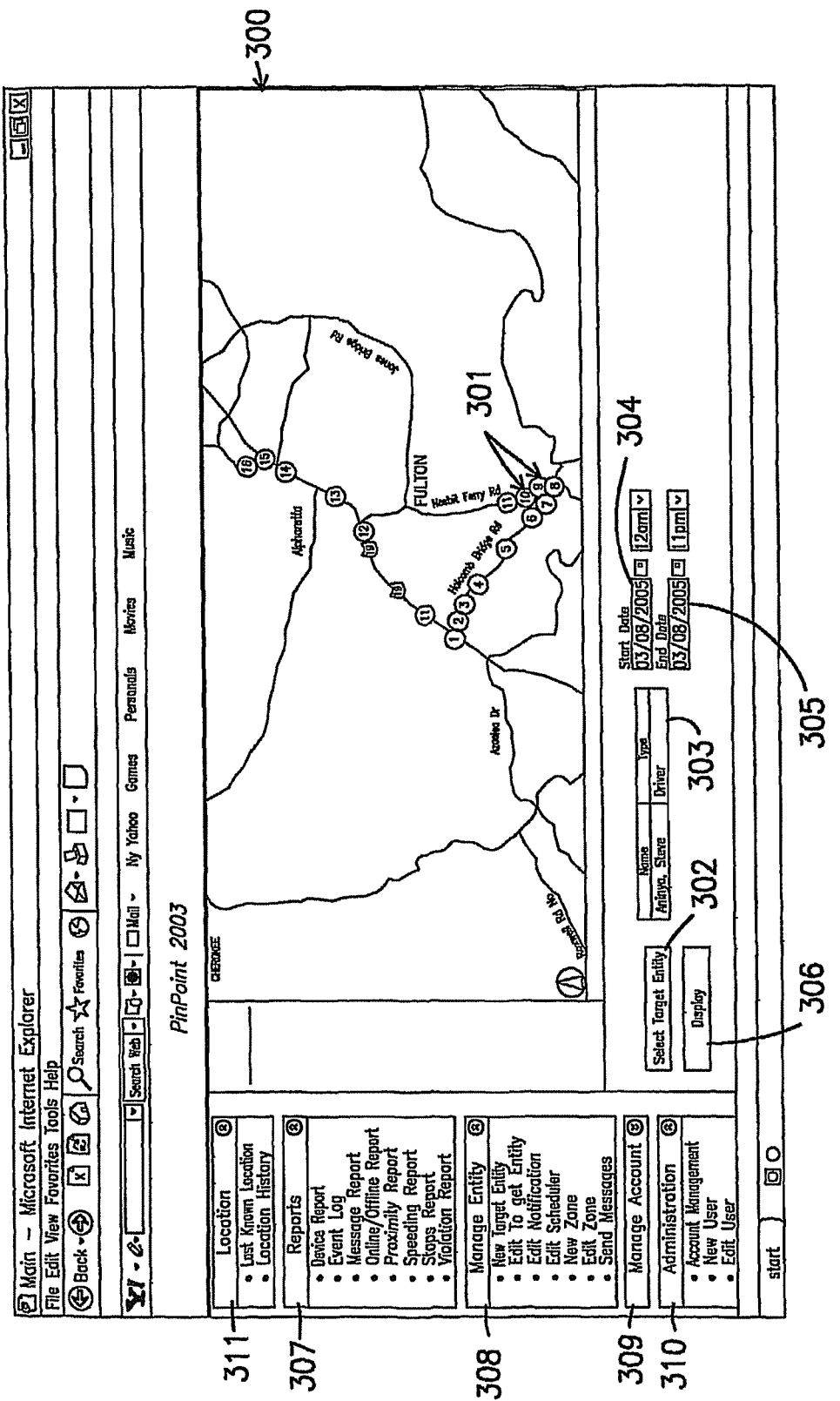
FIG. 9A is a screen display of a graphical location history map that may be generated with location data provided by the invention.
Figure 13:
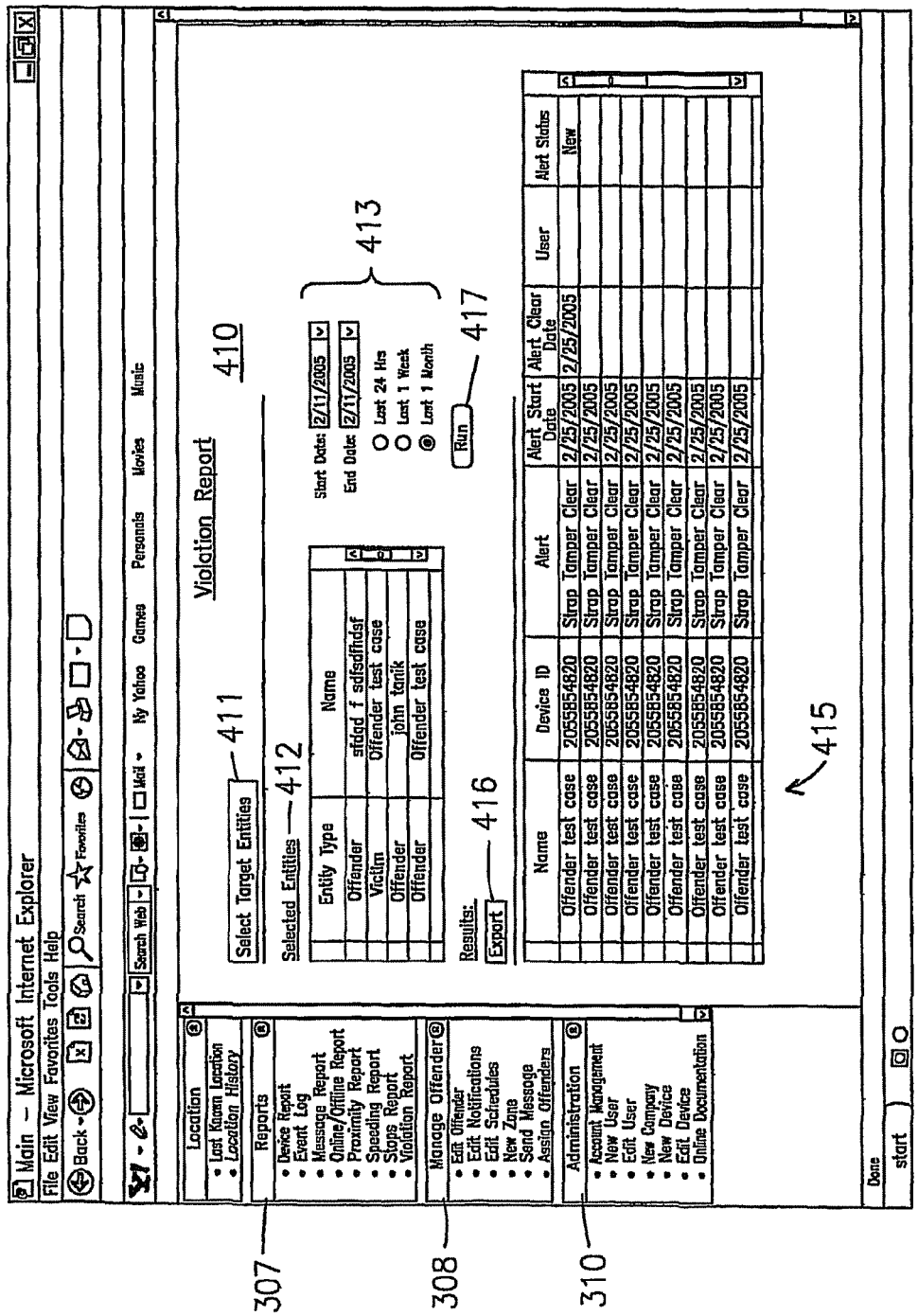
FIG. 13 is a screen display of a representative violation report that may be generated when utilizing the invention of the present system to monitor offenders subject to restrictions.

FIGS. 9 and 10 display a user web client 16 such as would be available to a probation officer or dispatcher utilizing the invention. FIG. 9A discloses a location history map 300 with indicators 301 showing the locations of a tracked individual over time. To utilize this reporting functionality, a location history is selected in the location menu 311. The target entity is selected 302 and displayed 303. Starting time 304 and ending time 305 are entered and display 306 generates the appropriate mapping. The location history can also be generated in a text popup screen 315 with text entries 316 corresponding to numbered indicators 301 on the map screen 300. The location history may also be overlaid with the location history of one or more other monitored individuals for analysis, such as the enforcement of separation/non-association orders or to disclose behavioral patterns among offender groups. The locations and text route histories may be exported 317 into a digital file or document for use apart from the device management and interaction software. As shown in FIG. 9A, additional types of reporting and functionality are also available. Report menu 307 provides for the creation of device reports that could include items such as battery power, battery charging events, device tampering attempts, and the like as reflected in greater detail in FIG. 14. An event log may be created listing a variety of different types of events that may have transpired; a message report lists messages between a user and the device; an online/offline report lists the times that the device was not within a reporting area; and a proximity report provides data concerning the device's proximity to a particular location or another enabled device. A speeding report extrapolates the device speed between location reports and lists instances when the distance between way points indicates a speed in excess of a user designated limit. A stops report indicates locations where the device has remained stationary for a user-determined interval. A violation report as shown in FIG. 13 lists instances in which the device wearer has entered exclusion zones or deviated from established routing. Additional menus 308, 309, 310 are provided for management and administration functions discussed below.

Figure 10A:
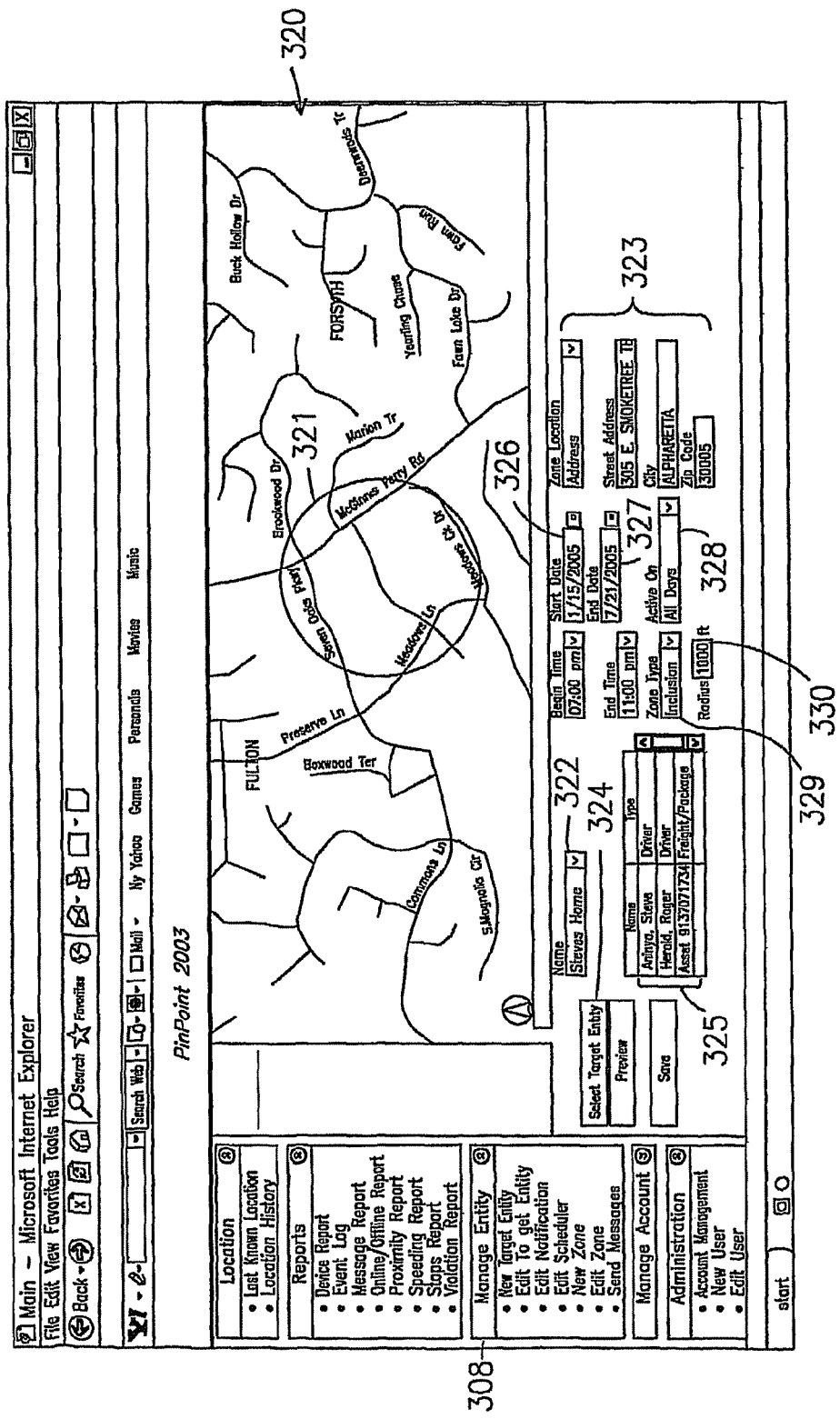
FIG. 10A is a screen display of graphical map of an inclusion zone defined according to the present invention.

FIG. 10A shows an inclusion/exclusion zone map 320 with defined inclusion zone 321. In the manage entity menu 308, new zones may be added and applied to target entities or existing zones may be edited. For a stationary zone such as inclusion zone 321, an address is entered 323 and named 322. Target entity is selected 324 and displayed 325. The zone has a starting time 326 and ending time 327 as is appropriate for offenders with a probationary term. The zone may be made active on all or selected dates 328, and the radius of the zone defined 330. In addition, the zone may be defined as inclusion or exclusion type 329.

Two particular advantages of the present invention are the ability to define buffer zones and mobile exclusion or inclusion zones. Relative to mobile zones for instance, inmates on a work crew may be assigned to an inclusion zone within a defined radius of a supervising corrections department official. The official will carry a device that is tracked by a administrative hub 10 as the official moves about. Any inmate whose device leaves the inclusion zone about the official's device generally causes alerts to be sent with tracking data so that the inmate may be apprehended. Similarly, an offender subject to a restraining order not to come within a certain radius of a victim may be equipped with a location device 100 and the victim also equipped with a location device, preferably by simply installing the necessary software on a GPS enabled cellular phone. The system then tracks the mobile locations of both the offender and the victim and sends appropriate alerts to one or more of the victim, the offender, and monitoring officer. In addition, the present invention provides for the creation of reportable events that are not explicit violations of rules applicable to an offender, for instance by allowing the creation of buffer zones that are not strict inclusion or exclusion zones. As an example, an offender might be subject to a 500 foot exclusion order, that creates a 500 foot exclusion zone around the victim and the victim's home and place of work. The system permits the definition of a larger buffer zone, perhaps 1000 feet or a quarter mile in radius, and if the offender lingers in the expanded buffer zone beyond a user designated time period, perhaps thirty minutes or an hour, notification is sent to a monitoring officer or included in reports.

In an alternative mode of operation, when the system determines that an offender or subscriber is in close proximity to an exclusion zone or similar critical location, the system can order the device to operate autonomously to determine its location. In this mode, of operation, the device becomes location aware by processing GPS coordinates and any assisted GPS information that it can obtain to determine its own geolocation, and it may also apply its own rule analysis to the determined location. This autonomous operating mode may also be implemented if the device loses contact with the system for a predetermined interval of time. As an alternative to switching a device to autonomous operation for performing onboard geolocation and 'rule' analysis, the administrative hub might alternatively simply order the device to collect and transmit GPS and assisted GPS data with increased frequency.

Two optional features of the invention's geo coding databases also increase its effectiveness. The first of these is the ability of the geo coding database to allow the addition and publishing of custom information. So, for instance, as shown in FIG. 10A, an address is added for an inclusion zone 321 which might be an offender's home address where he is required to remain throughout an evening curfew period. This information would typically be considered custom information to an offender monitoring service. However, if custom information is added by a subscriber to the system that would be of more widespread interest, such as the location of a probation office or a substance abuse treatment facility, or a roadway speed limit, the subscriber has the ability to publish that information so that those details will be available on the public geo coding databases available to all subscribers to the system. Of course, prior to allowing the publishing of information to the public database, there is a review for format compliance and accuracy. In addition, web crawlers are utilized to harvest information for additions to the public or master geo coding database. Web crawlers are directed to search for specified criteria and return a listing of proposed changes to existing geo coding data meeting the designated criteria, and potential additions to the geo coding data meeting the program criteria which are then reviewed and added by an efficient work process such as single click approval.

The second geo coding database feature that improves operability of the system is an auto correction aspect. Publicly available geo coding databases include numerous, usually minor, defects due to errors in data coding as well as the development of new subdivisions and new building construction. If the center point for an inclusion or exclusion zone or other critical location point is set incorrectly, it can lead to a number of false alerts. In prior art systems, when a monitored offender generates an alert, the protocol has been for a call to be initiated to ask the offender to confirm his location and in the event of repeated erroneous alerts, to send a GPS reader out to the physical location to recalibrate the geo coding for that location. However, according to the invention, the administrative hub monitors new inclusion zones and other appropriate critical points for the first few days after their entry into the system. If it is determined that an offender's apparent inhome time is not centered within an inclusion zone, the inclusion zone can be automatically recentered or recalibrated to the real location. This auto configuration is particularly useful for offender monitoring when there is an incorrect geo coding or a coding of a mailbox location instead of a house location for a particular address. Similarly, new construction sites may have only estimated geolocations and may require correction once construction has proceeded sufficiently. In another situation benefiting from auto correction, deliveries of shipments of goods that are being tracked may take place at a loading dock 100 yards or more from the coded geolocation of a facility. The ability to accurately track the transportation and delivery of goods to provide exception based reporting of route deviations combined with the ability to proactively optimize supply channel efficiencies, such as loading dock utilization and minimized waiting times for delivery, will further the goal of logistics managers to achieve complete, audited, unattended delivery.

Figure 10B:
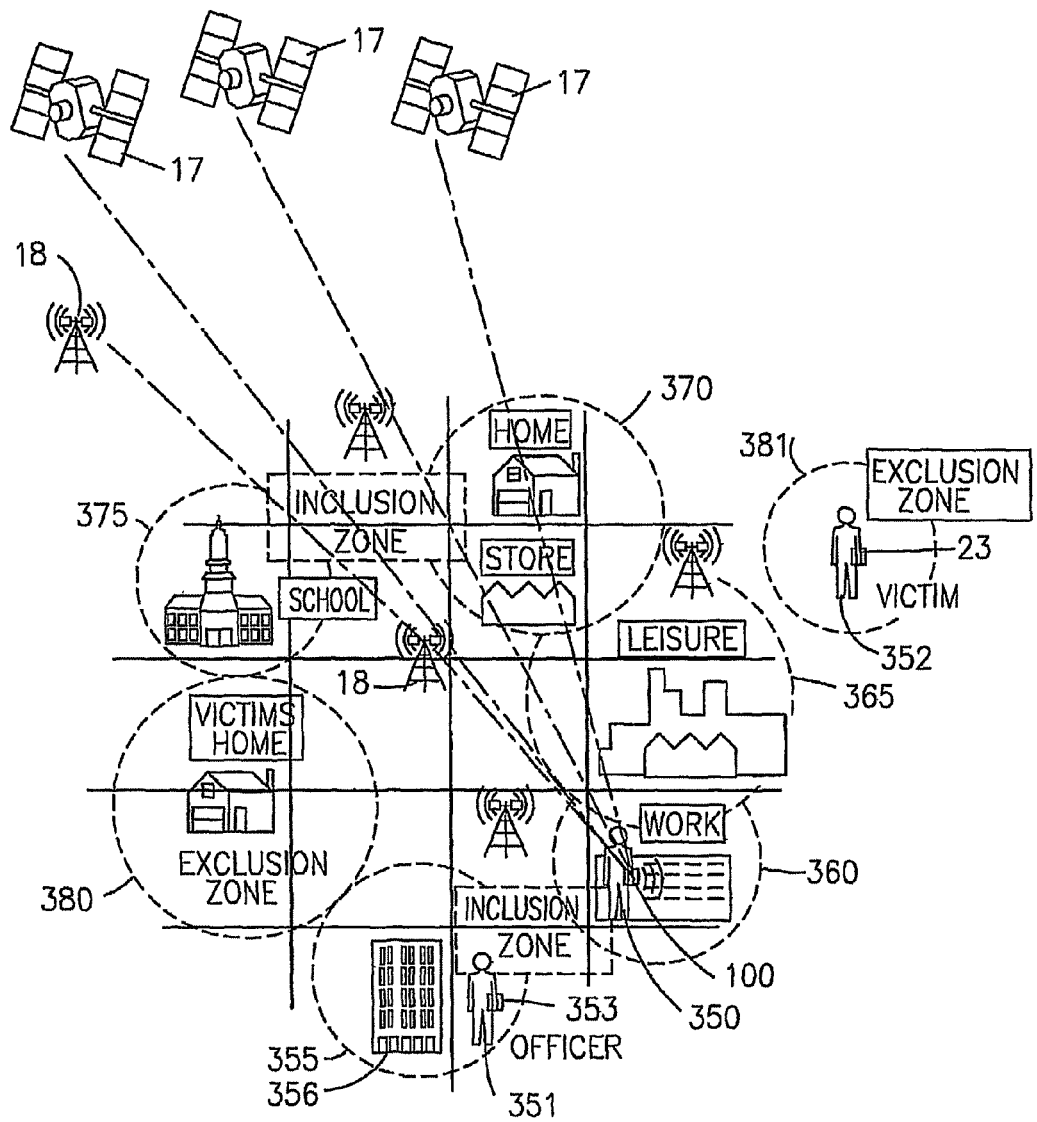
FIG. 10B is a schematic representation of inclusion and exclusion zones.

FIG. 10B illustrates inclusion and exclusion zones in operation. Specifically, an offender 350 is equipped with tracking device 100. An officer 351 is also equipped with a communication device 353 which might be sending communications to an enabled device ranging in sophistication from a cell phone 23 to a laptop computer 22, or the officer 351 may even be within a corrections facility 356 equipped with a work station 21 running web client 16. Generally, the corrections facility 356 would be within an inclusion zone 355 to permit the offender 350 to report for monthly probation officer meetings. In addition, the offender 350 would frequently be provided an inclusion zone 360 on workdays during work hours for his place of work. In some instances, the offender 350 would be allowed an inclusion area 365 for some leisure activities during selected hours, inclusion zone 370 for his place of residence and shopping needs, and if attending classes an inclusion zone 375 to attend school. An exclusion zone 380 would be established around the victim's home and possibly the victim's place of work. In addition, according to the present invention, victim 352 may carry a GPS enabled cell phone or other device running software according to the present invention and have a mobile exclusion zone 381 that moves with the victim's location. Thus, if the victim 352 were in one of the offender's 350 inclusion zones, then the system may generate notices to any of: the victim 352 to advise of the proximity of offender 350; the offender 350 to advise that the usual inclusion zone is not currently permitted; or the officer 351 to alert the officer to the developing situation so that corrective action may be taken.

Figure 11:
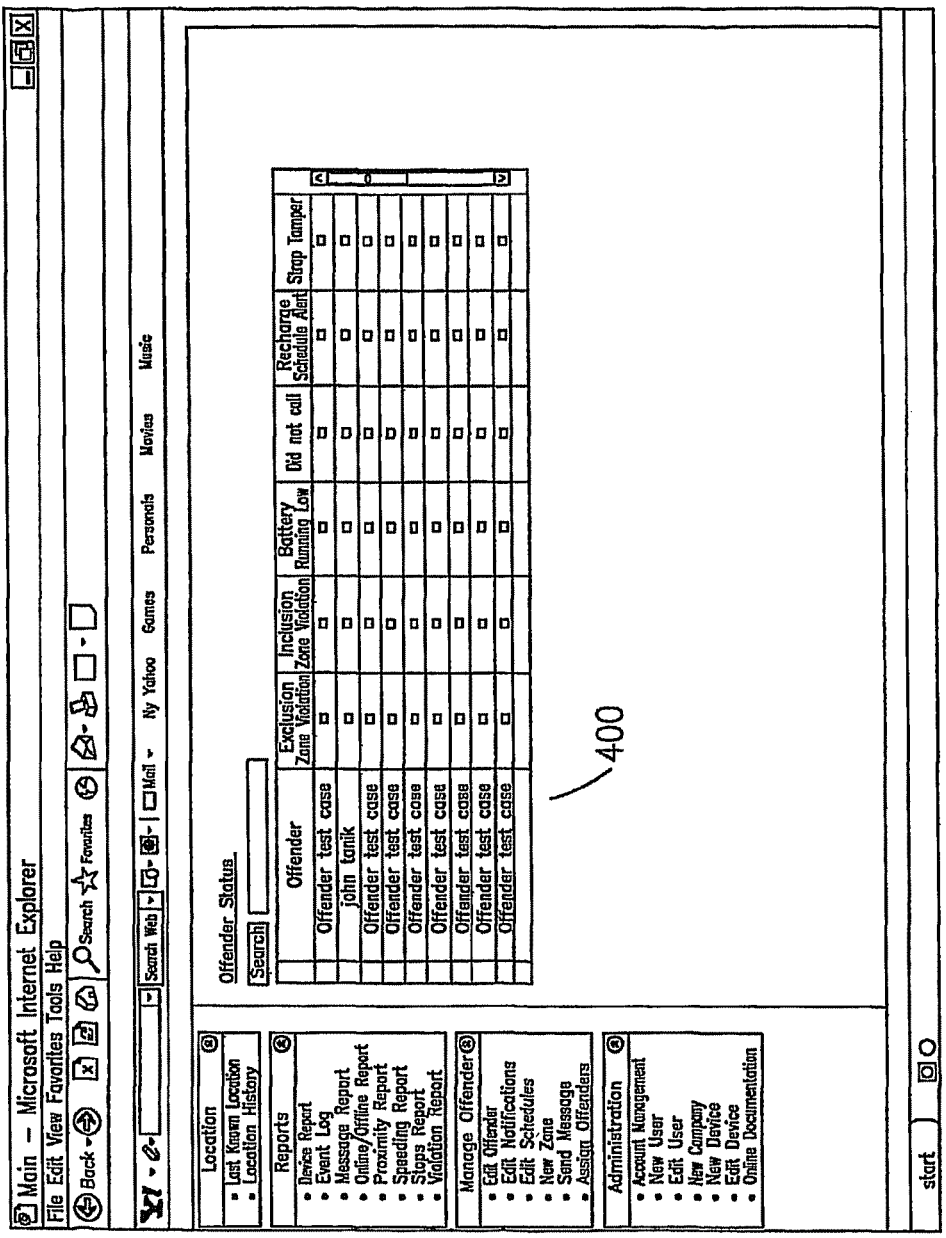
FIG. 11 is a screen display of a status report for individuals being monitored according to the present invention.

FIG. 11 shows a useful management report 400 for a probation officer or other corrections official with monitoring responsibility. The report lists offender status by user defined criteria, and in the illustrated case those criteria are of zone violations, battery status and recharge scheduling, failure to call in when required, and strap tampering events.

Figure 12:
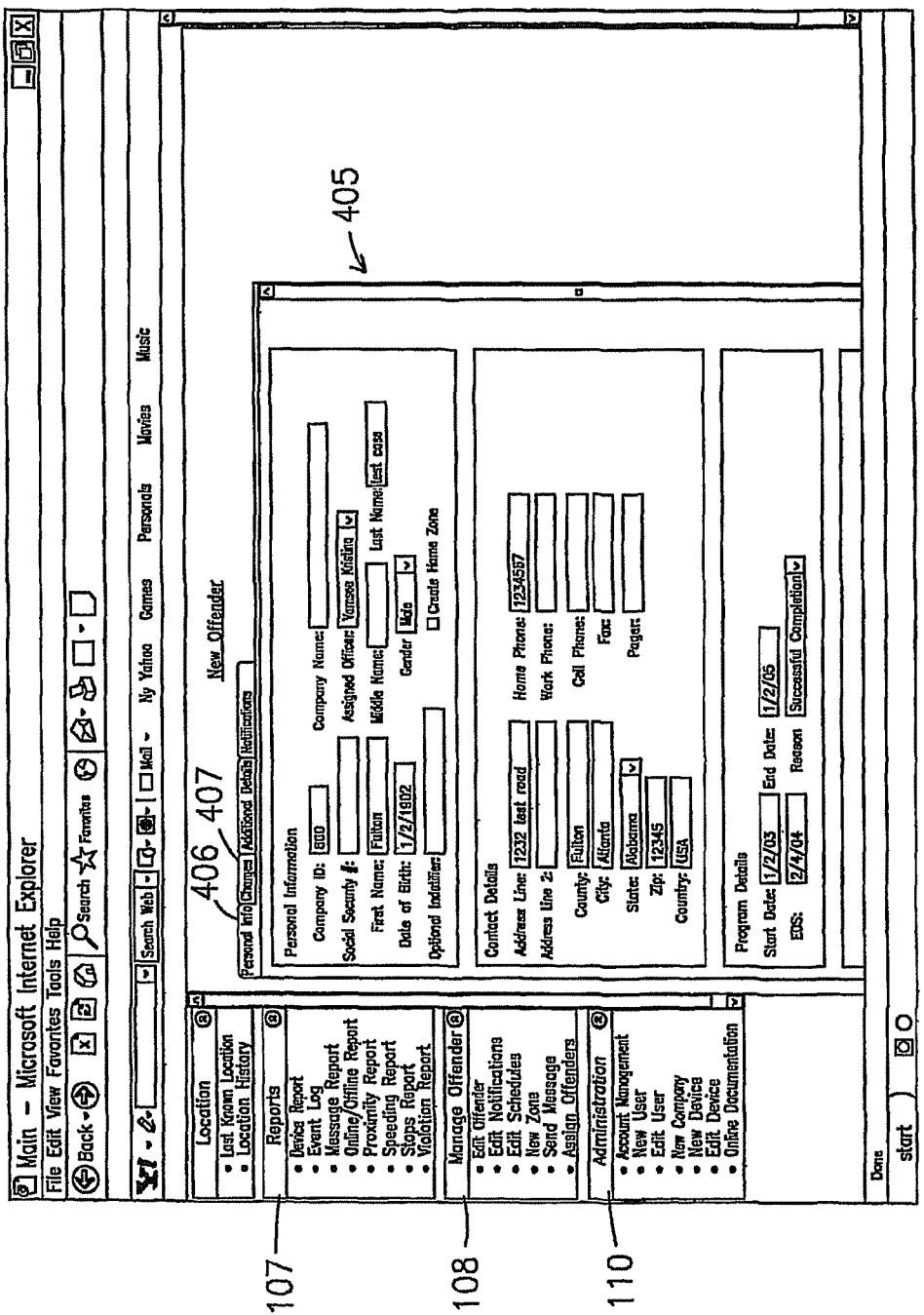
FIG. 12 shows a screen display of a data entry template for a new individual to be monitored according to the present invention.

FIG. 12 shows the new offender data entry template 405 which is generated by the new offender item or manage offender menu 308. As shown, the new offender template has tabbed 406, 407 pages to permit the entry of personal information, charges, additional offender details and notifications. Adding new offenders is typically a user administrative function that may be accomplished over user web client 16 shown in FIG. 1. From this description, it will be appreciated that several databases are employed in the operation of the system. For instance, there is a database of devices that are being monitored by the system for their locations; there is a database of offenders, subscribers or assets that are associated with devices and rules associated with those offenders, subscribers or assets; there is a database of clients of the system and the users and user rights for each client; and there is a GPS map or location database that may be supplemented with additional information by clients and by selective purchases of data such as registered sex offender residence data.

FIG. 13 shows a violation report which is produced from report menu 307. After violation report activity is selected, the user selects the entities or offenders upon which the report is to be generated 411 and those entities are displayed 412. The user also selects the interval 413 over which the violations are to be displayed. When the report is run 417, text report 415 is generated. The report may be exported 416 to a digital file or document for use outside the monitoring and tracking system.

Figure 14:
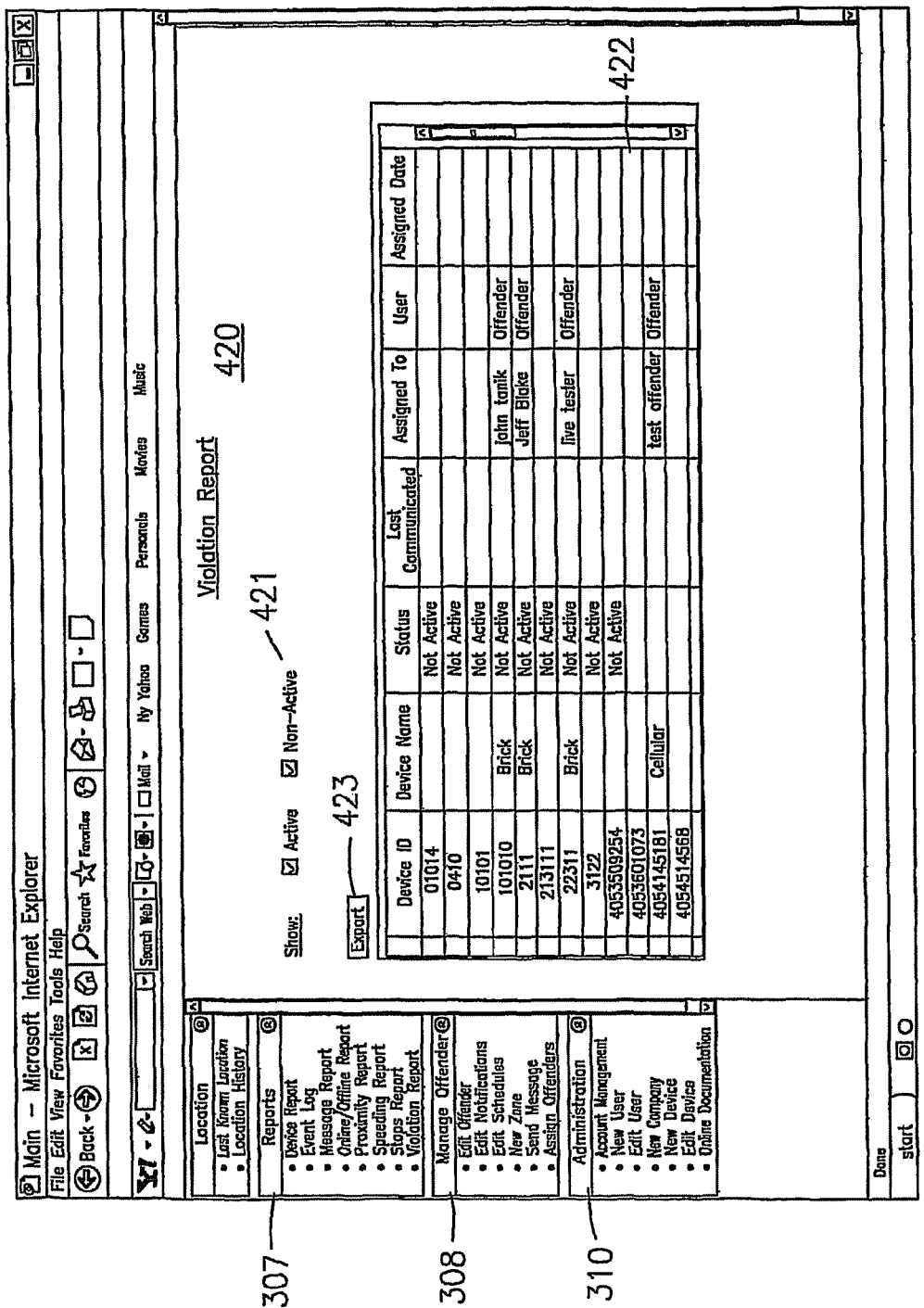
FIG. 14 is a screen display of a representative device report for devices being monitored according to the present invention.

The report menu 307 also permits generation of device report 420 shown in FIG. 14. From this report, the user can select active or nonactive devices 421 or both, and a report is generated showing device ID and type, such as an offender ankle bracelet, cellular phone, or the like, and other pertinent device information. A text report 422 can be generated, and the data in the report may be exported 423 to a digital file or document for use outside the tracking system.

Figure 15:
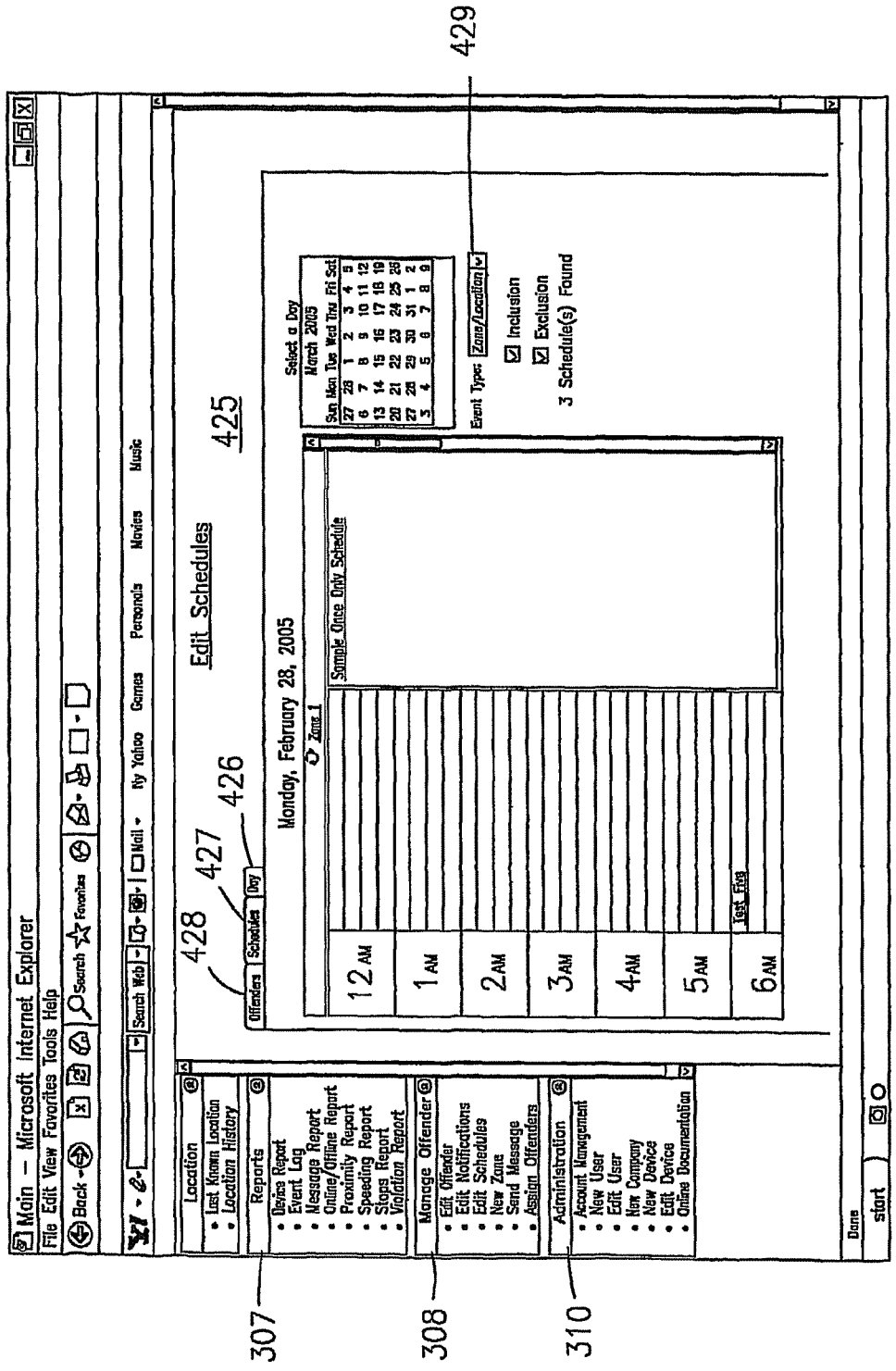
FIG. 15 shows a screen display of a management function template for editing schedules.
Figure 16:
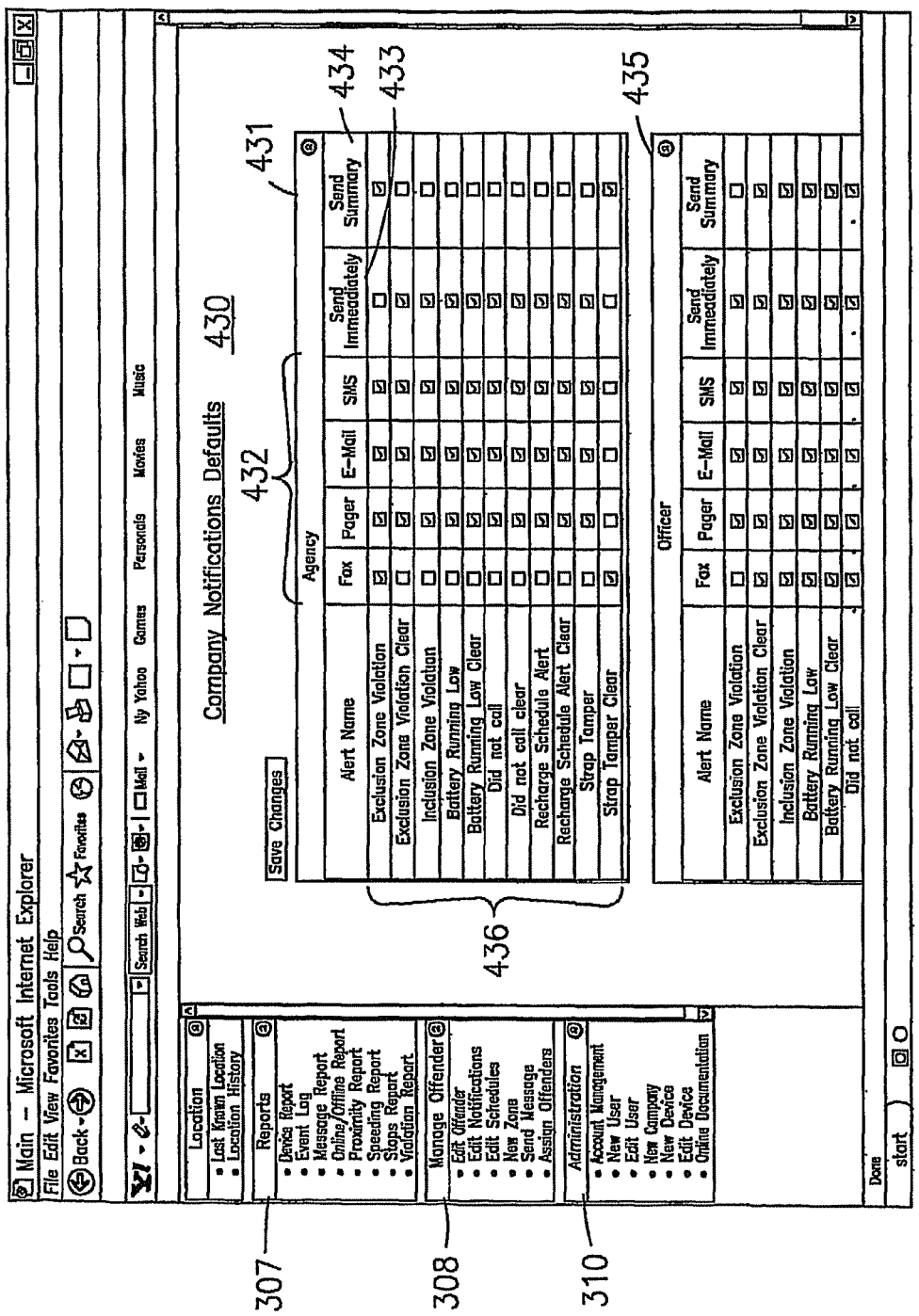
FIG. 16 depicts a screen display of a management schedule for automatic notification procedures.

The manage entity or offender menu 308 permits entity schedules to be edited. FIG. 15 shows the edit schedule template 425 whereby utilizing tabs 426, 427, 428 offenders and their schedules may be selected and entries for particular days may be edited with event types 429, which may be appointments or particular time periods for application of inclusion or exclusion zones. In the administration menu 310, authorized administrative personnel may perform necessary updates such as managing various agency accounts, authorizing new agency or company users, editing existing user information, adding new agency or company accounts and editing account information, and adding new devices or editing device information FIG. 16 displays an edit company report showing company notification defaults 430. This allows the agency, such as a probation department subscribing to the service to designated parameters to the administrative hub 10 specifying communications methods 432 to be employed upon the occurrence of selected events 436 with respect to the agency 431, to a responsible officer for a particular offender 435 and to a victim or other interested third party. Illustrated communication methods include by fax, pager, e-mail, and SMS text messaging, and messages may be sent immediately 433 and/or provided in summary 434.

Figure 17:
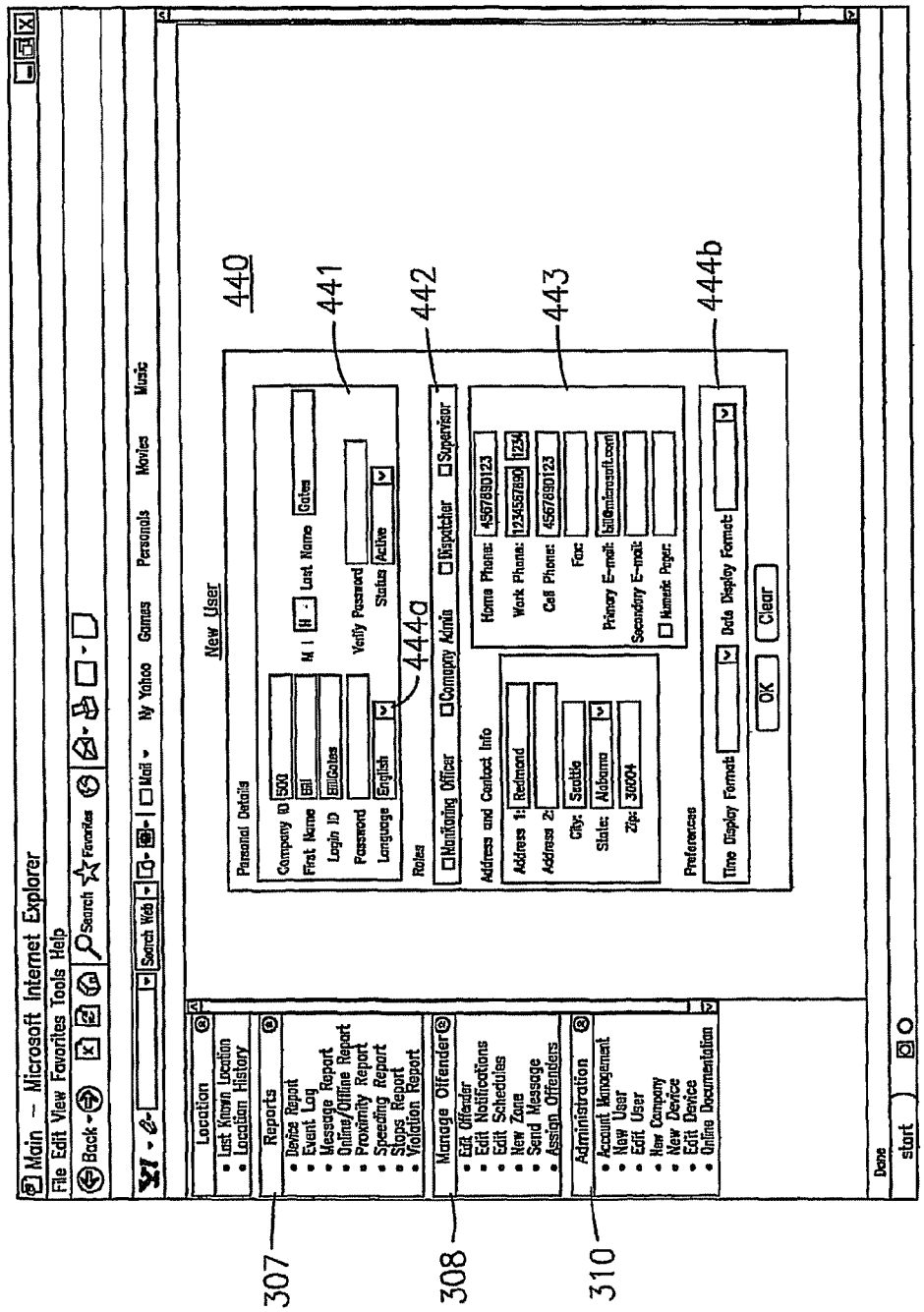
FIG. 17 shows a screen display of an administrative data entry form for establishing a new user on the system.
Figure 18:
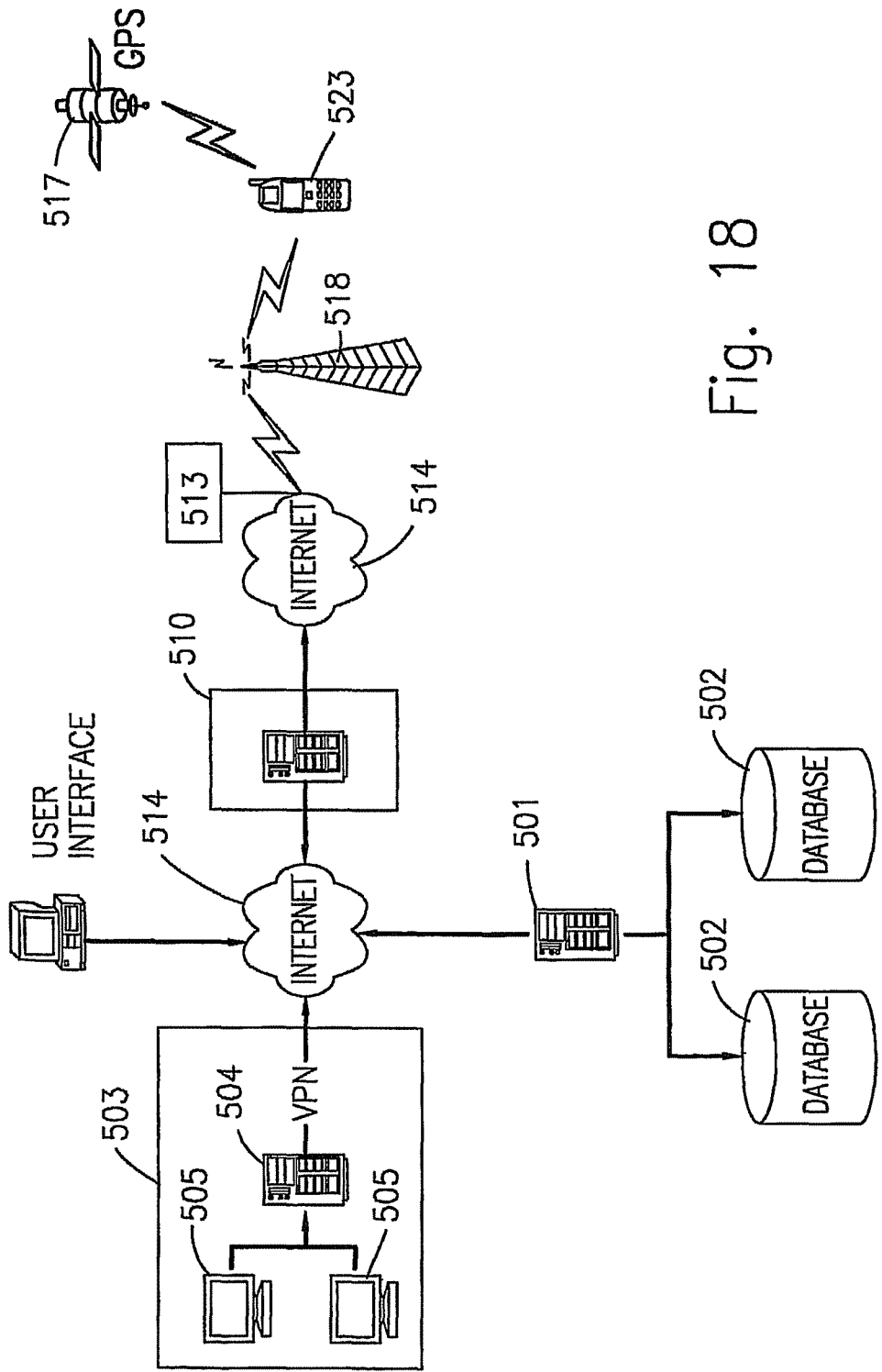
FIG. 18 is a schematic illustration of the implementation of a response network.

FIG. 17 shows another administrative menu 310 section, that of the new user template 440. The template collects system identification information such as user name and login password 441; the user's role 442 within the company or agency which will define to some extent the user's rights to access various aspects of the system, with a company administrator or supervisor having a greater rights than a monitoring officer or dispatcher. User contact information 443 is also collected, and user preferences 444a, 444b may also be input.

The system provides for the monitoring of a wide variety of criteria. A wearable device 100 may be equipped with a transdermal sensor for offender alcohol monitoring and with a thermometer for body temperature readings. In addition, stationary reporting devices such as active RFID readers 20, intrusion or smoke alarms may be placed in facilities 19 and generate signals to administrative hub 10. Upon obtaining a message from such a fixed reporting device, the administrative hub can automatically direct certain actions and make appropriate notifications. For instance, a smoke alarm message could lead the administrative hub 10 to seek confirmation from user facility staff, and in the absence of rapid confirmation that there is no problem, the appropriate fire department may be notified. An intrusion alarm may generate a call to a response network as described below. Similarly, a RFID reader 20 may signal warning that an offender is entering a restricted area and cause appropriate action to be taken. Patients in assisted living facilities may also be equipped with RFID tags that are read and generate messages to the administrative hub 10 that may cause nearby doors to be locked to prevent patients from leaving the building or entering restricted areas such as kitchen and maintenance facilities, while avoiding the need to maintain the facility in a heavily supervised or lockdown mode.

With reference to FIGS. 18-22, the operation of a response network useful primarily outside the offender monitoring marketplace may be explained. For instance, FIG. 18 reflects the operation of the system with administrative hub 510 in connection with an individual subscriber running appropriate software to communicate with the system on cell phone 523 and subscribing to a security service with administrative node 501, where the security service is communication with police dispatch node 503 over a virtual private network. When the subscriber with cell phone 523 encounters an alarm condition, as by holding down the numeral 9 on the cell phone 523 (see step 530 in FIG. 22), the cell phone transmits a panic signal 531 to the administrative hub 510. The administrative hub 510 automatically responds by causing the cell phone 523 to increase the frequency of its location transmission 532. Accordingly, rather than generating a signal to collect GPS data and assisted GPS data from GPS satellites 517 and cellular radio towers 518 about every two to five minutes, ephemeral location data may be collected every 30 seconds and transmitted to administrative hub 510. The administrative hub 510 or a location aggregator 513 will calculate the geolocation of the subscriber 533. If the location is successfully determined 534, and if that location is also the location wherein the subscriber previously had a confirmed location 535, then the security service node 501 will respond by dispatching aid to that physical location 536. The dispatch may be a private guard service employed by a security service, or in cooperation with police authorities the security service may communicate from node 501 to police dispatch node 503 and a police unit may be dispatched to the location. Indeed, the dispatch alternatives are not limited to private security guards and official police dispatch, but the security service may contract with an entire response network which may include off-duty police personnel, police authorities not merely from a particular municipality, but also both federal and state police authorities, and police authorities from nearby counties and municipalities. In addition, paramedic and medical personnel and even qualified volunteers may form part of a response network. When these resources, as on-duty police authorities, off-duty police authorities, private security, and medical personnel, are available for use by response network, they will activate their tracking devices and will be subject to being monitored and plotted on location maps in near real time. When an event occurs, the security service collecting the alarm event is then able to determine the nearest responder with the appropriate training for the type of alarm condition, and then attempt to contact that responder and inform the responder of the location of the event. If the responder accepts the engagement, a predetermined fee will be paid (unless an on-duty police authority) and the fastest possible response should be achieved. Thus, it will be appreciated that if the subscriber alarm in FIG. 22 was determined to be a medical alarm, paramedic or medical personnel would be dispatched rather than police authorities.

Returning to FIG. 22, however, if the location is determined for the alarm is not at the subscriber's previous confirmed location but it is near or inside a community protected by a security service 550, then police authorities may be contacted and an agent responsible for community protection may be contacted 551. In addition, appropriate messages are sent to distribution lists appropriate to the type of event and the location 537, 552. Messages may be sent as text messages, faxes, emails or voice calls, depending upon the urgency and device-types of the users to whom the messages are being sent. The subscriber is called or messaged when the appropriate action has been implemented 538, 553. Logic also provides that if the location is not precisely determined, police or responders are dispatched to the best last known location 541, 544, 555. Appropriate notifications are sent 542, 546, and a subscriber is notified of the action being taken 543, 557.

Figure 19:
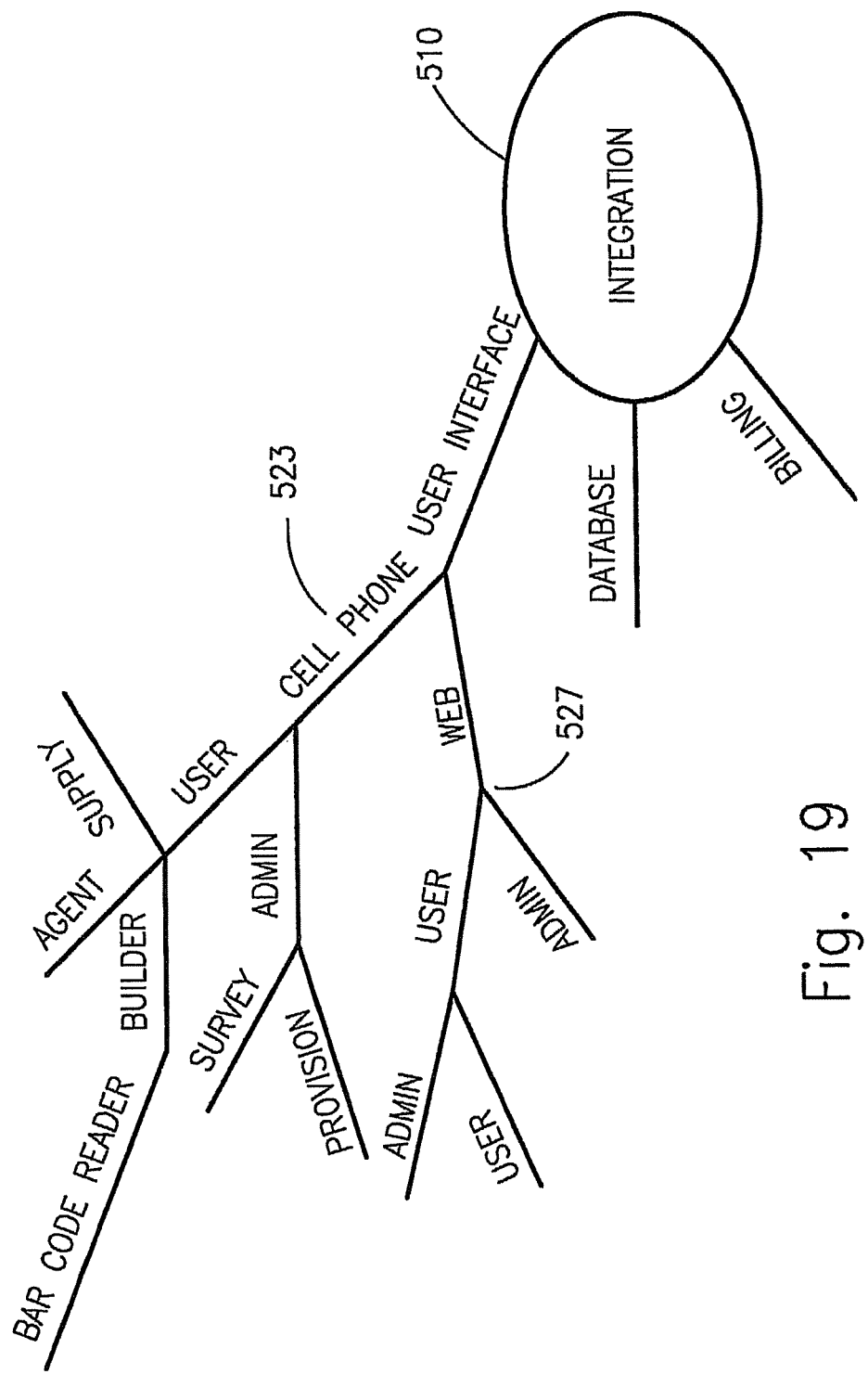
FIG. 19 is a schematic illustration of communication paths of users of a system implementing the invention.

FIG. 19 shows the integration of many users and services into the actions coordinated by administrative hub 510. For a client or subscriber to services provided by administrative hub 510, communication is by web enabled device 527 or cell phone 523. Administrative users for a client define the authorized users, enroll devices and identify the rules and reporting protocols. In a real estate-centric application, survey information will be added to geo coding database, builders will add sensors to new buildings, real estate agents and contractors will be able to activate and deactivate alarm devices to suit their needs, and the administrative hub will maintain appropriate databases with a fully auditable record of events and produce appropriate billing information for clients.

Figure 20:
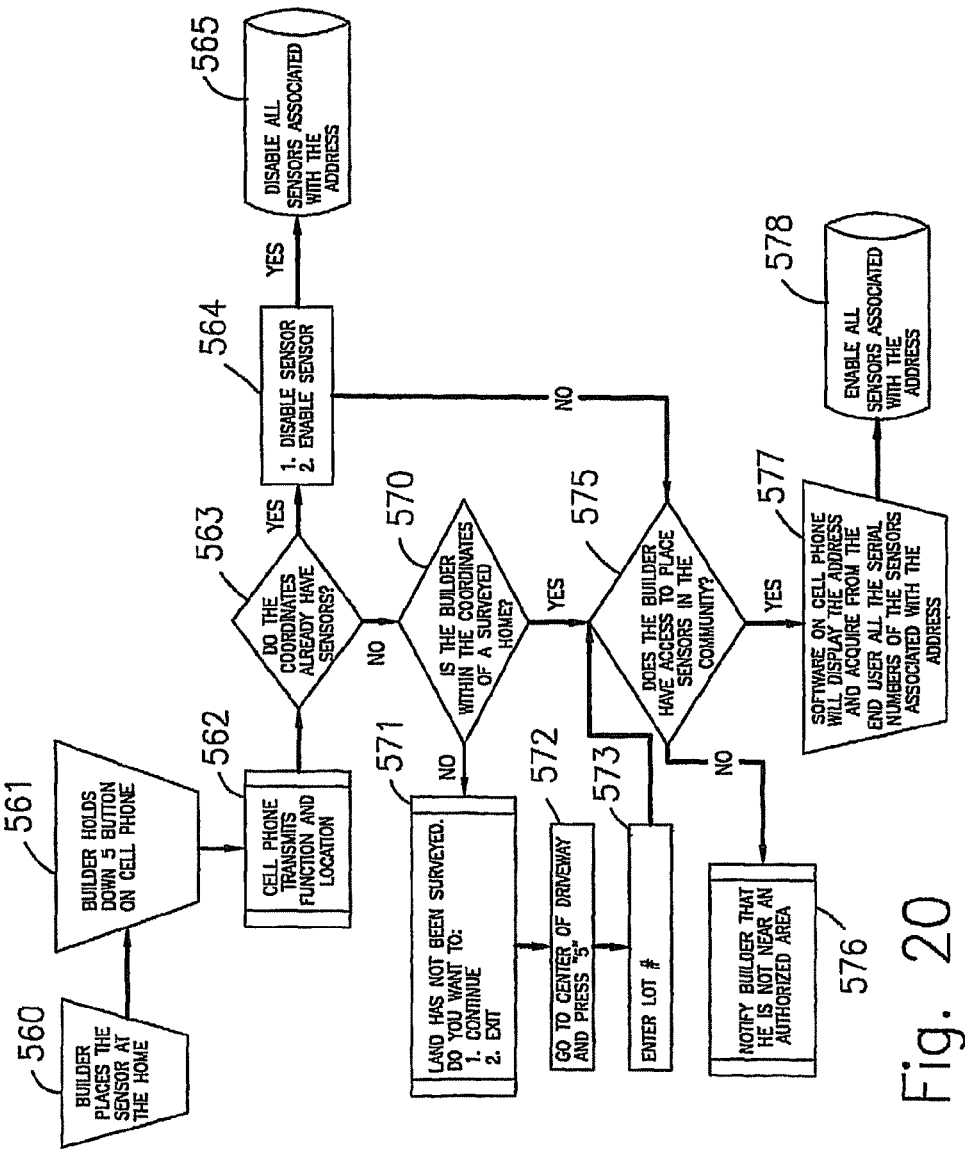
FIG. 20 is a flow chart of a method of adding and removing sensors to report alarm conditions at a physical location.

FIG. 20 shows a process for adding or removing sensors from a building, with a particular focus on new home building. First, builder will place a sensor at a home 560 and depress the 5 button on builder's cell phone 561, that cell phone being a device enrolled with the administrative hub of the invention. The administrative hub receives the signal of the 5 button being depressed and location information is computed either autonomously by the cell phone or by a location aggregator or the administrative hub from ephemeral data. The administrative hub first determines whether the location already has sensors installed 563 and allows the builder to elect 564 whether to disable existing sensors at the location 565. If the builder is not at a geolocation that is identified as a home site 570, then an option is provided to exit 571 or to proceed to establish a location 572 and enter a identifying number 573 for the home site. If the builder is authorized to place sensors at the site 575, then the builder will need to provide the serial numbers of the sensors associated with the location 577, and the sensors will be enabled 578. If the builder is not in an area where he is authorized to enable sensors, he will be so notified 576.

Figure 21:
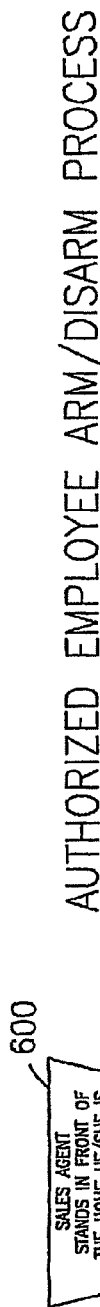
FIG. 21 is a flow chart of a process of arming and disarming sensors at a physical location.
Figure 22:
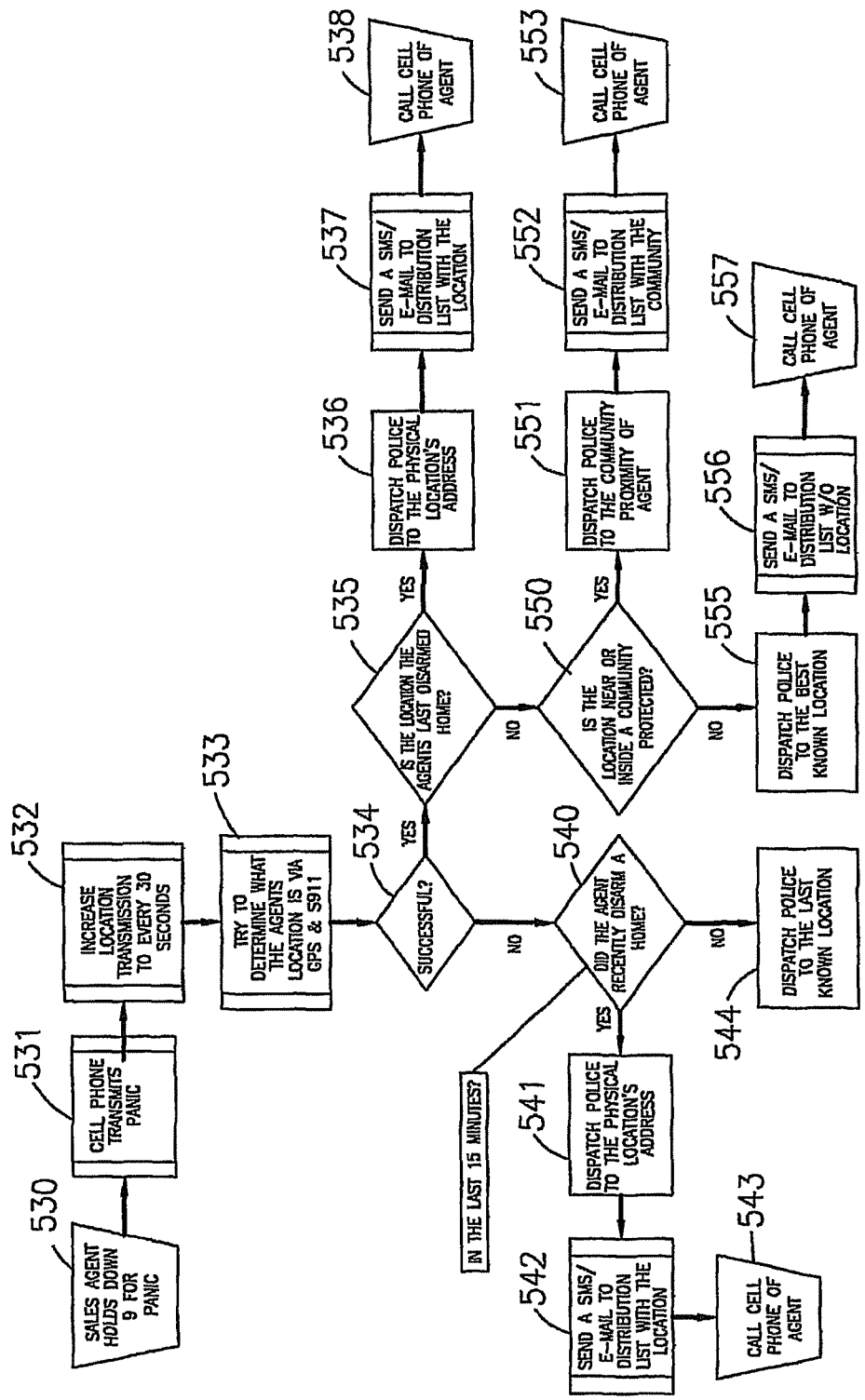
FIG. 22 is a flow chart of a process of implementing a response to a monitored individual's alarm condition.

FIG. 21 demonstrates steps by which a real estate agent arriving at an alarmed property to show the property to a prospective purchaser, or a tradesman arriving to perform work at an alarmed property, may disarm the alarm while necessary to work and then the alarm be reactivated upon departure of the real estate agent or tradesman. For instance, the agent may position themselves at the building where the alarm is to be disarmed, and the 3 button on the agent's cell phone is depressed. The phone transmits the disarm function together with data upon which the location aggregator or administrative hub may determine the location of the phone 601. If the administrative hub determines that the geolocation is not at a alarm protected building 602, a notification is sent to that effect 603, and it is requested that the identifying number of the building be entered 604. If the geolocation coordinates are at a protected building, the administrative hub determines whether the requester has access to disarm 610, and failing appropriate authority, a notification is sent 611, and an auditable history is created for future reporting 612. If the agent has authority to disarm the alarm sensor, then the building is disarmed and an appropriate history record created. The administrative hub then signals the requesting phone to increase the frequency of transmission of data for location determination 621 so that the administrative hub may determine when the agent has left the home in order to rearm the alarm system. After the building is disarmed 620, text message is sent verifying that the alarm was disarmed 622, and the message recorded for future reporting 623.

With the frequent reporting of location information 621, the administrative hub actively monitors the agent's location 624. So long as the agent is still at the location of the disarmed home 625, the system takes no action 626. However, once the agent is no longer at that location, the administrative hub rearms the sensors at the building 627. Also at this time, the agent's phone is reset to original intervals for location reporting 626 and records are created of the time at which sensors were rearmed. If the agent or tradesperson remains in the building beyond a predetermined period of time, such as one or two hours, the administrative hub may request confirmation that the alarms be maintained in their disarmed status and failing confirmation of the need to maintain disarmed status, the alarms would then be reactivated.

Alternatively, the agent may depress another phone button such as 7 at the end of visit to an alarmed property, to create a signal back to the administrative hub to reactivate the home alarm system. Communication between the administrative hub and a home alarm system is typically over a POTS connection, however, an appropriately configured home system may be communicated with by wireless communications or a fixed line IP connection.

While the invention has been explained with respect to particular embodiments, numerous other location aware reporting applications exist, such as reporting to judges or judicial personnel if they are in proximity to monitored offenders, or if monitored offenders are in proximity to their residence, or reporting to parents proximity to residences or physical locations of monitored or registered sex offenders.

All publications, patents, and patent documents are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

What is claimed is:

1. A monitoring system comprising:
   a wireless tracking device; and
   an administrative hub comprising a location database including speed limit data for at least selected road segments, the administrative hub configured to:
      monitor locations of the wireless tracking device based on data reported by the wireless tracking device;
      extrapolate a speed of the wireless tracking device from the locations of the wireless tracking device; and
      compare the extrapolated speed of the wireless tracking device to the speed limit data for a road segment associated with the location of the wireless tracking device, wherein the administrative hub comprises a geocoding database, and wherein the administrative hub is further configured for subscriber addition of custom information about a roadway speed limit to the geocoding database and further for publication of the custom information on a public geocoding database for availability to other subscribers, wherein the administrative hub is further configured to compare at least one of the locations of the wireless tracking device to geocoding information stored in the public geocoding database to determine if the stored geocoding information is incorrect and, if deemed incorrect, automatically correcting the stored geocoding information.

2. The monitoring system of claim 1, wherein the wireless tracking device is a tracking device carried or worn by an individual, installed in or on a vehicle, or installed in or on a mobile communication device or a combination thereof.

3. The monitoring system of claim 1, wherein the administrative hub is further configured to generate an event log comprising a location report based on the monitored locations of the wireless tracking device, or a speed report based on the compared speed of the wireless tracking device to the speed limit data, or a combination thereof.

4. The monitoring system of claim 1, wherein the administrative hub is further configured to generate a speeding report based on the compared speed of the wireless tracking device to the speed limit data when the compared speed of the wireless tracking device exceeds a speed limit for a road segment associated with the location of the wireless tracking device.

5. The monitoring system of claim 1, wherein the administrative hub further comprises a database containing a set of prescribed rules applicable to the wireless tracking device.

6. The monitoring system of claim 5, wherein at least one of the prescribed rules is obeying a speed limit.

7. The monitoring system of claim 5, wherein the administrative hub is further configured to:
determine whether at least one of the prescribed rules is violated based on the data from the wireless tracking device; and
generate a violation report when the at least one of the prescribed rules is violated.

8. The monitoring system of claim 1, wherein the data reported by the wireless tracking device comprises data indicative of a location of the device.

9. The monitoring system of claim 8, wherein the administrative hub is further configured to determine the speed of the wireless tracking device based on the data reported by the wireless tracking device by extrapolating the speed from a first location in first data reported by the wireless tracking device and a second location in second data reported by the wireless tracking device.

10. A monitoring method comprising:
receiving, with an administrative hub comprising a location database including speed limit data for at least selected road segments, data reported by a wireless tracking device, wherein the administrative hub comprises a geocoding database;
monitoring, with the administrative hub, locations of the wireless tracking device based on the data reported by the wireless tracking device, the administrative hub comprising a location database;
extrapolating, with the administrative hub, a speed of the wireless tracking device from the locations of the wireless tracking device;
comparing, with the administrative hub, the extrapolated speed of the wireless tracking device to the speed limit data for a road segment associated with the location of the wireless tracking device;
receiving, with the administrative hub, information about a roadway speed limit from a subscriber and adding the received information to the geocoding database;
publishing the added information about the roadway speed limit on a public geocoding database for availability to other subscribers; and
comparing, with the administrative hub, at least one of the locations of the wireless tracking device to geocoding information stored in the public geocoding database to determine if the stored geocoding information is incorrect and, if deemed incorrect, automatically correcting the stored geocoding information.

11. The monitoring method of claim 10, wherein the wireless tracking device is a personal tracking device carried or worn by an individual, installed in or on a vehicle, or installed in or on a mobile communication device or a combination thereof.

12. The monitoring method of claim 10, further comprising generating, with the administrative hub, an event log comprising a location report based on the monitored locations of the wireless tracking device, or a speed report based on the compared speed of the wireless tracking device to the speed limit data, or a combination thereof.

13. The monitoring method of claim 10, further comprising generating, with the administrative hub, a speeding report based on the compared speed of the wireless tracking device to the speed limit data when the compared speed of the wireless tracking device exceeds a speed limit for a road segment associated with the location of the wireless tracking device.

14. The monitoring method of claim 10, wherein the administrative hub further comprises a database containing a set of prescribed rules applicable to the wireless tracking device.

15. The monitoring method of claim 14, wherein at least one of the prescribed rules is obeying a speed limit.

16. The monitoring method of claim 14, further comprising:
determining, with the administrative hub, whether at least one of the prescribed rules is violated based on the data from the wireless tracking device; and
generating, with the administrative hub, a violation report when the at least one of the prescribed rules is violated.

17. The monitoring method of claim 10, wherein the data reported by the wireless tracking device comprises data indicative of a location of the device.

18. The monitoring method of claim 17, further comprising determining, with the administrative hub, the speed of the wireless tracking device based on the data reported by the wireless tracking device by extrapolating the speed from a first location in first data reported by the wireless tracking device and a second location in second data reported by the wireless tracking device.

* * * * *